US012430280B2

(12) United States Patent
Doddi et al.

(10) Patent No.: US 12,430,280 B2
(45) Date of Patent: Sep. 30, 2025

(54) MECHANISM TO IMPROVE THE RELIABILITY OF SIDEBAND IN CHIPLETS

(71) Applicant: QUALCOMM Incorporated, San Diego, CA (US)

(72) Inventors: Ravindranath Doddi, Hyderabad (IN); Umamaheshwaran V, Salem (IN); Afreen Haider, Muzaffarpur (IN); Lekhya Pavani Godavarthi, Hyderabad (IN); Harinatha Reddy Ramireddy, Hyderabad (IN); James Lionel Panian, San Marcos, CA (US); Ramacharan Sundararaman, San Jose, CA (US); Santhosh Reddy Akavaram, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 64 days.

(21) Appl. No.: 18/466,299

(22) Filed: Sep. 13, 2023

(65) Prior Publication Data

US 2025/0086136 A1   Mar. 13, 2025

(51) Int. Cl.
  *G06F 13/42*  (2006.01)
  *G06F 15/78*  (2006.01)
(52) U.S. Cl.
  CPC ...... *G06F 13/4282* (2013.01); *G06F 15/7825* (2013.01)
(58) Field of Classification Search
  None
  See application file for complete search history.

(56) References Cited

U.S. PATENT DOCUMENTS

| | | |
|---|---|---|
| 2004/0236815 A1 | 11/2004 | Mirsky et al. |
| 2011/0179212 A1 | 7/2011 | Hartman |
| 2016/0179718 A1 | 6/2016 | Morris et al. |
| 2016/0342566 A1 | 11/2016 | Lee |
| 2017/0235701 A1 | 8/2017 | Pethe et al. |
| 2022/0222198 A1* | 7/2022 | Lanka ............... G06F 13/4273 |
| 2022/0327083 A1 | 10/2022 | Das Sharma et al. |

OTHER PUBLICATIONS

International Search Report and Written Opinion—PCT/US2024/042867—ISA/EPO—Nov. 26, 2024.

* cited by examiner

*Primary Examiner* — Idriss N Alrobaye
*Assistant Examiner* — Dayton Lewis-Taylor
(74) *Attorney, Agent, or Firm* — Muncy, Geissler, Olds & Lowe, P.C.

(57) ABSTRACT

Various embodiments include methods and devices for implementing Universal Chiplet Interconnect Express (UCIe) link configuration for multi-module chiplets of a computing device. Embodiments may include transitioning a UCIe link in an active state having a first sideband that is active to the UCIe link in a reset state, and initializing at least one sideband for the UCIe link that is a different functional sideband of a multi-module chiplet than the first sideband following the reset state of the UCIe link. Embodiments may include reading sideband data configured to represent a functional sideband of the multi-module chiplet, and initializing the functional sideband as the at least one sideband. Embodiments may include reading sideband data configured to represent at least two functional sidebands of the multi-module chiplet, and initializing at least one functional sideband of the at least two functional sidebands as the at least one sideband.

27 Claims, 18 Drawing Sheets

| Reserved | Active Sideband 1 | Active Sideband 0 | Functional Sideband 3 | Functional Sideband 2 | Functional Sideband 1 | Functional Sideband 0 | Sideband Select Enable |
|---|---|---|---|---|---|---|---|

400

| Active Sideband 1 | Active Sideband 0 | Active Sideband |
|---|---|---|
| 0 | 0 | Functional Sideband 0 |
| 0 | 1 | Functional Sideband 1 |
| 1 | 0 | Functional Sideband 2 |
| 1 | 1 | Functional Sideband 3 |

500

600

MECHANISM TO IMPROVE THE RELIABILITY OF SIDEBAND IN CHIPLETS

BACKGROUND

The Universal Chiplet Interconnect Express (UCIe) specification provides for chiplets to operate in multi-module (or interface) configurations, either in a pair of 2 or 4 modules (or interfaces). The multi-module configurations are applicable to both standard (low bandwidth) and advanced (high bandwidth) packages. In multi-module configurations, after the initialization of the sidebands and mainbands, only one sideband of one module will be configured to send the required messages and other sidebands of the other modules will be in powered off state.

SUMMARY

Various aspects provide methods include methods and apparatuses for implementing such methods for configuring the Universal Chiplet Interconnect Express (UCIe) link between multi-module chiplets of a computing device. Various aspects may include transitioning a UCIe link in an active state having a first sideband that is active to the UCIe link in a reset state, and initializing at least one sideband for the UCIe link that is a different functional sideband of a multi-module chiplet than the first sideband following the reset state of the UCIe link. Some aspects may further include reading active sideband data configured to represent a functional sideband of the multi-module chiplet from a sideband select information structure, in which initializing the at least one sideband for the UCIe link that is a different functional sideband of the multi-module chiplet than the first sideband following the reset state of the UCIe link may include initializing the functional sideband represented by the active sideband data.

Some aspects may further include receiving a sideband configuration signal having active sideband data configured to represent a functional sideband of the multi-module chiplet, in which the functional sideband includes the at least one sideband for the UCIe link that is a different functional sideband of the multi-module chiplet than the first sideband, and setting a value at a sideband select information structure based on the active sideband data.

Some aspects may further include reading aggregate sideband data configured to represent at least two functional sidebands of the multi-module chiplet from a sideband aggregate information structure, in which initializing the at least one sideband for the UCIe link that is a different functional sideband of the multi-module chiplet than the first sideband following the reset state of the UCIe link may include initializing the at least one functional sideband of the at least two functional sidebands represented by the aggregate sideband data. In some aspects, the at least two functional sidebands represented by the aggregate sideband data may include the first sideband and the at least one sideband or the at least one sideband and not the first sideband.

Some aspects may further include initializing the first sideband for the UCIe link following the reset state of the UCIe link. Some aspects may further include identifying that a process implemented using the at least one sideband is complete, and clearing aggregate sideband data configured to represent at least two functional sidebands of the multi-module chiplet from a sideband aggregate information structure, in which the at least two functional sidebands include the at least one sideband.

Some aspects may further include identifying that another multi-module chiplet supports a UCIe link using at least two sidebands, in which initializing the at least one sideband for the UCIe link that is a different functional sideband of the multi-module chiplet than the first sideband following the reset state of the UCIe link occurs following identifying that the another multi-module chiplet supports a UCIe link using at least two sidebands.

In some aspects, transitioning the UCIe link in the active state having the first sideband that is active to the UCIe link in the reset state may include transitioning the UCIe link in the active state to the UCIe link in the reset state link based on an elapsed period. Some aspects may further include receiving a sideband configuration signal having a sideband timer data, setting a value at a sideband timer information structure based on the sideband timer data, updating the value at the sideband timer information structure, and comparing the value of the sideband timer information structure to a threshold sideband timer value, in which the elapsed period is based on comparing the value of the sideband timer information structure to the threshold sideband timer value.

Further aspects include a computing device including a memory, a processor, multi-module chiplets connected via a UCIe link, and/or a UCIe link configuration device configured to perform operations of any of the methods summarized above. Further aspects include a multi-module chiplet connected via a UCIe link, and a UCIe link configuration device configured to perform operations of any of the methods summarized above. Further aspects include a multi-module chiplet having means for performing functions of any of the methods summarized above. Further aspects include a computing device having means for performing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
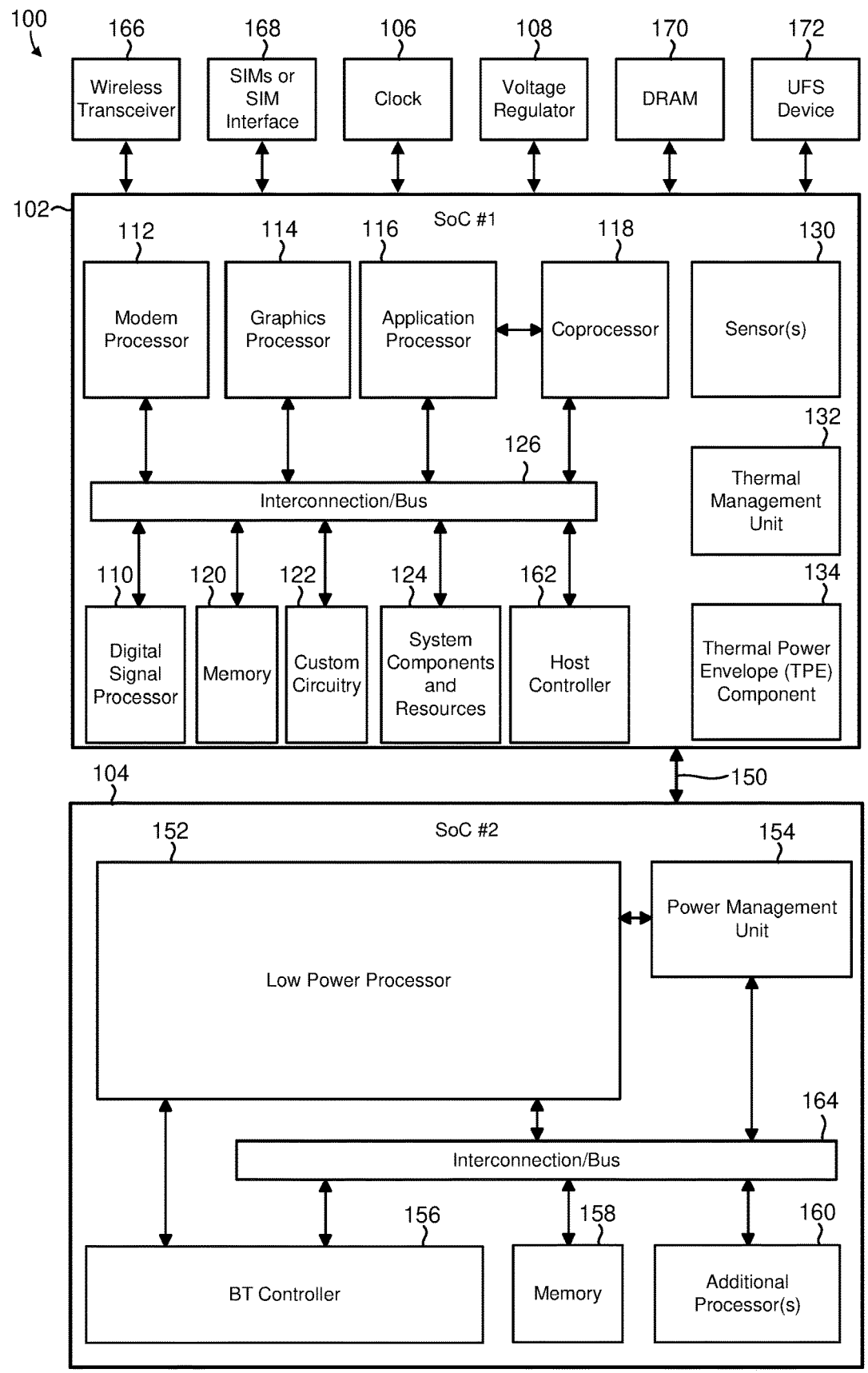
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods of implementing multi-module chiplet configured Universal Chiplet Interconnect Express (UCIe) link sideband configurations. Various embodiments of a multi-module chiplet configured UCIe link sideband configuration may include sideband selection in which a sideband of a UCIe link may be changed from a sideband of one UCIe communication module to a sideband of another UCIe communication module during runtime. Various embodiments of a multi-module chiplet configured UCIe link sideband configuration may include sideband aggregation in which one or more sidebands of one or more UCIe communication modules may be initialized in addition to a sideband of a UCIe communication module previously initialized for a UCIe link. Various embodiments may include configuring one or more sidebands of a UCIe link in response to a sideband configuration signal by updating a sideband configuration register and using the sideband configuration register settings while training the UCIe link. Various embodiments may include triggering training the UCIe link based on the UCIe link entering a low power state, which may occur in response to a UCIe link power usage policy and/or a sideband configuration timer.

The term "computing device" is used herein to refer to stationary computing devices including personal computers, desktop computers, all-in-one computers, workstations, super computers, mainframe computers, embedded computers (such as in vehicles and other larger systems), computing systems within or configured for use in vehicles, servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

The term "chiplet" is used herein to describe an integrated circuit that is communicably connected to at least one other chiplet in a package via a die-to-die interconnect scheme, such as UCIe. Each chiplet may be configured for specific a function(s). For example, each chiplet may be designed for data storage functions, signal processing functions, input/output (I/O) functions, etc. Multiple chiplets may be configured as a system-on-chip (SoC). The chiplets of a package may be connected to a shared semiconductor substrate and to each other via a shared semiconductor interposer, such as in a 2.5D package. The chiplets may be stacked such that at least one chiplet may be connected to the shared semiconductor substrate and/or the shared semiconductor interposer through another chiplet, such as in a 3D package. Stacked chiplets may be connected to one or more other chiplets via the shared semiconductor interposer.

Various embodiments are described in terms of code, e.g., processor-executable instructions, for ease and clarity of explanation, but may be similarly applicable to any data, e.g., code, program data, or other information stored in memory. The terms "code," "data," and "information" are used interchangeably herein and are not intended to limit the scope of the claims and descriptions to the types of code, data, or information used as examples in describing various embodiments.

The UCIe specification provides for chiplets that operate in multi-module (or interface) configurations, either in a pair of 2 or 4 modules (or interfaces). The multi-module configurations are applicable to both standard (low bandwidth) and advanced (high bandwidth) packages. In multi-module configurations, after the initialization of the sidebands and mainbands, only one sideband of one module will be configured to send the required messages and other sidebands of the other modules will be in powered off state.

The one active sideband in multi-module configurations have some limitations. For example, in the cases of 2.5D and 3D packaging technologies, it is possible to have thermal hot spots at different points of an SoC. If the active sideband is always fixed, any hotspot close to the module of the active sideband can introduce data integrity issues. As another example, in use cases like firmware loading, patch downloading, configuration management, security protocol and data module (SPDM) information exchange, and the like, latency is introduced because the single active sideband must be shared to complete the management activities.

Various embodiments address and overcome the foregoing problems by enabling runtime configuration of the sidebands of multi-module configured UCIe connected chiplets (referred to herein in as "multi-module chiplets") at runtime by selecting a different sideband than the single active sideband and/or aggregating one or more additional sidebands to the single active sideband. The multi-module chiplets may include multiple communication modules that may each enable a mainband connection and/or a sideband connection. Runtime configuration of the sidebands of the multi-module chiplets may include training a UCIe link between multi-module chiplets to use the sidebands of one or more of the communication modules.

Various embodiments provide additional benefits over current UCIe link between multi-module chiplets implementations, increasing reliability of the sidebands as a result of reducing hardware stress for a sideband by changing the sidebands periodically and/or episodically. Additionally, during sideband failures, faulty sidebands may be switched for functional sidebands to re-establish communication.

Selecting a different sideband than the single active sideband may include the multi-module chiplets training the UCIe link to use the different sideband of a different communication module than the communication module of the single active sideband. The different communication module may be at a different location of a multi-module chiplet than a location of the communication module of the single active sideband. The different module may be located further from a hotspot of an SoC, of which the multi-module chiplet is a component, than the communication module of the single active sideband. The additional distance from the hotspot may lessen a detrimental impact of the hotspot on data integrity of data communications of the different sideband compared to data communications of the single active sideband.

Selecting a sideband that is different than the single active sideband may effectively change the active sideband for the multi-module chiplet at runtime. To change the active sideband, data configured to set the active sideband may be changed from data representing a current active sideband to data representing a next active sideband from among at least one other inactive sideband. For example, the data stored at a sideband configuration register configured to set the active sideband (referred to herein as a "sideband select register") may be changed from data representing the current active sideband to data representing the next active sideband. In some embodiments, the data configured to set the active sideband may be set according to a signal from a software and/or firmware executed at the multi-module chiplet. The multi-module chiplet may interpret the data configured to set the active sideband at runtime and change the active sideband using the data configured to set the active sideband as the next active sideband rather than the current active sideband.

In some embodiments, changing the active sideband may be triggered during a normal course of UCIe link management, such as during execution of a UCIe link training process during runtime. The UCIe link training process may be triggered by a UCIe link transitioning from an active state to a low power state (e.g., "L2" state) and to a reset state. The sideband select register may be a sticky register configured to retain the data at the sideband select register through the reset state. The multi-module chiplet may interpret the data configured to set the active sideband from the sideband select register during the UCIe link training process, such as at a sideband initialization state. The UCIe link may be trained using the data configured to set the active sideband as the next active sideband rather than the current active sideband.

A sideband configuration timer, referred to herein as sideband select timer, may also be implemented to trigger changing the active sideband. In some embodiments, the sideband select timer may be set according to a signal from the software and/or firmware executed at the multi-module chiplet. The sideband select timer may be configured to signal to the multi-module chiplet to implement the link training process to change the active sideband based on an elapsed period of the sideband select timer.

Aggregating one or more additional sidebands to the single active sideband may include training the UCIe link to use the one or more additional sidebands of one or more additional communication modules to the communication module of the single active sideband. Using more sidebands than only the single active sideband increases throughput, reducing latency, between the multi-module chiplets to execute the management activities, such as firmware loading, patch downloading, configuration management, SPDM information exchange, etc.

Aggregating one or more additional sidebands to the single active sideband may effectively configure multiple active sidebands from the multiple sidebands for the multi-module chiplet at runtime. To configure multiple active sidebands, a data configured to set the multiple active sidebands may be set. For example, the data stored at a sideband configuration register configured to set the multiple active sidebands, referred to herein as sideband aggregate register, may be set. The data may be set to indicate which of the multiple sidebands are the multiple active sidebands. In some embodiments, the data configured to set the multiple active sidebands may be set according to a signal from the software and/or firmware executed at the multi-module chiplet. The multi-module chiplet may interpret the data configured to set the multiple active sidebands at runtime and set the multiple active sidebands.

In some embodiments, configuring the multiple active sidebands may be triggered during a normal course of UCIe link management, such as during execution of a UCIe link training process during runtime. The UCIe link training process may be triggered by a UCIe link transitioning from an active state to a low power state (e.g., "L2" state) and to a reset state. The sideband aggregate register may be a sticky register configured to retain the data at the sideband aggregate register through the reset state. The multi-module chiplet may interpret the data configured to set the multiple active sidebands from the sideband aggregate register during the UCIe link training process, such as at a sideband initialization state. A UCIe link may be trained using the data configured to set the multiple active sidebands.

A sideband configuration timer, referred to herein as sideband aggregate timer, may also be implemented to trigger configuring the multiple active sidebands. In some embodiments, the sideband aggregate timer may be set according to a signal from the software and/or firmware executed at the multi-module chiplet. The sideband aggregate timer may be configured to signal to the multi-module chiplet that the chiplet should implement the UCIe link training process to configure the multiple active sidebands based on an elapsed period of the sideband aggregate timer.

FIG. 1 is a component block diagram illustrating an example computing device 100 suitable for implementing any of the various embodiments. Various embodiments may be implemented on a number of single processor and/or multiprocessor computer systems, including a system-on-chip (SoC) or system in a package.

With reference to FIG. 1, the illustrated example computing device 100 (which may be a system-in-a-package in some embodiments) may include any combination of one or more SoCs 102, 104 coupled to a clock 106, a voltage regulator 108, at least one subscriber identity module (SIM) and/or a SIM interface 168, a DRAM 170, a Universal FLASH Storage (UFS) device 172, a wireless transceiver 166 configured to send and receive wireless communications via an antenna (not shown) to/from wireless computing devices, such as a base station, wireless device, and/or computing device. In some embodiments, the first SoC 102 may operate as a central processing unit (CPU) of the computing device 100 that carries out the instructions of software application programs by performing the arithmetic, logical, control and input/output (I/O) operations specified by the instructions. In some embodiments, the second SoC 104 may operate as a specialized processing unit. For example, the second SoC 104 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 102 may include a digital signal processor (DSP) 110, a modem processor 112, a graphics processor 114, an application processor (AP) 116, one or more coprocessors 118 (e.g., vector co-processor) connected to one or more of the processors, memory 120, custom circuitry 122, system components and resources 124, a host controller 162, an interconnection/bus module 126, one or more sensors 130 (e.g., accelerometer, temperature sensor, pressure sensor, optical sensor, infrared sensor, analog sound sensor, etc.), a thermal management unit 132, and a thermal power envelope (TPE) component 134. The second SoC 104 may include a low power processor 152, a power management unit 154, an interconnection/bus module 164, a BT controller 156, memory 158, and one or more various additional processors 160, such as an applications processor, packet processor, etc.

Each processor 110, 112, 114, 116, 118, 152, 160 may include one or more cores, and each processor/core may perform operations independent of the other processors/cores. For example, the first SoC 102 may include a processor that executes a first type of operating system (e.g., FreeBSD, LINUX, OS X, etc.) and a processor that executes a second type of operating system (e.g., MICROSOFT WINDOWS 10). In addition, any or all of the processors 110, 112, 114, 116, 118, 152, 160 may be included as part of a processor cluster architecture (e.g., a synchronous processor cluster architecture, an asynchronous or heterogeneous processor cluster architecture, etc.).

The first and second SoC 102, 104 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 124 of the first SoC 102 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 124 and/or custom circuitry 122 may also include circuitry to interface with peripheral devices, such as cameras, electronic displays, wireless communication devices, external memory chips, etc.

The first and second SoC 102, 104 may communicate via interconnection/bus module 150. In some embodiments, the interconnection/bus module may be a connection established by transceiving (i.e., receiving and transmitting) components within both the SoC 102 and SoC 104. For example, the low power processor 152 may include a universal asynchronous receiver-transmitter (UART) and the application processor 116 may include a multiple signal messages (MSM) UART driver that is communicatively connected to the UART of the low power processor 152.

The various processors 110, 112, 114, 116, 118, may be interconnected to one or more memory elements 120, system components and resources 124, and custom circuitry 122, and a thermal management unit 132 via an interconnection/bus module 126. Similarly, the low power processor 152 may be interconnected to the power management unit 154, the BT controller 156, memory 158, and various additional processors 160 via the interconnection/bus module 164. The interconnection/bus module 126, 150, 164 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 102, 104 may further include an input/output module (not illustrated) for communicating with resources external to the SoC, such as a clock 106, a voltage regulator 108, one or more wireless transceivers 166, and at least one SIM and/or SIM interface 168 (i.e., an interface for receiving one or more SIM cards). Resources external to the SoC (e.g., clock 106, voltage regulator 108) may be shared by two or more of the internal SoC processors/cores. The at least one SIM 168 (or one or more SIM cards coupled to one or more SIM interfaces) may store information supporting multiple subscriptions, including a first 5GNR subscription and a second 5GNR subscription, etc.

In addition to the example computing device 100 discussed above, various embodiments may be implemented in a wide variety of computing systems, which may include a single processor, multiple processors, multicore processors, or any combination thereof.

In some embodiments, the various processors of the SoC 102 and SoC 104 may be located within a same SoC. For example, the application processor 116 and low power processor 152 may be located within a same SoC, such as in a single SoC of a wearable device.

In some embodiments, any of the components integral to the SoCs 102, 104 may be composed of one or more multi-module chiplets configured to communicate with other multi-module chiplets according to UCIe protocols for multi-module chiplet configurations.

Figure 2:
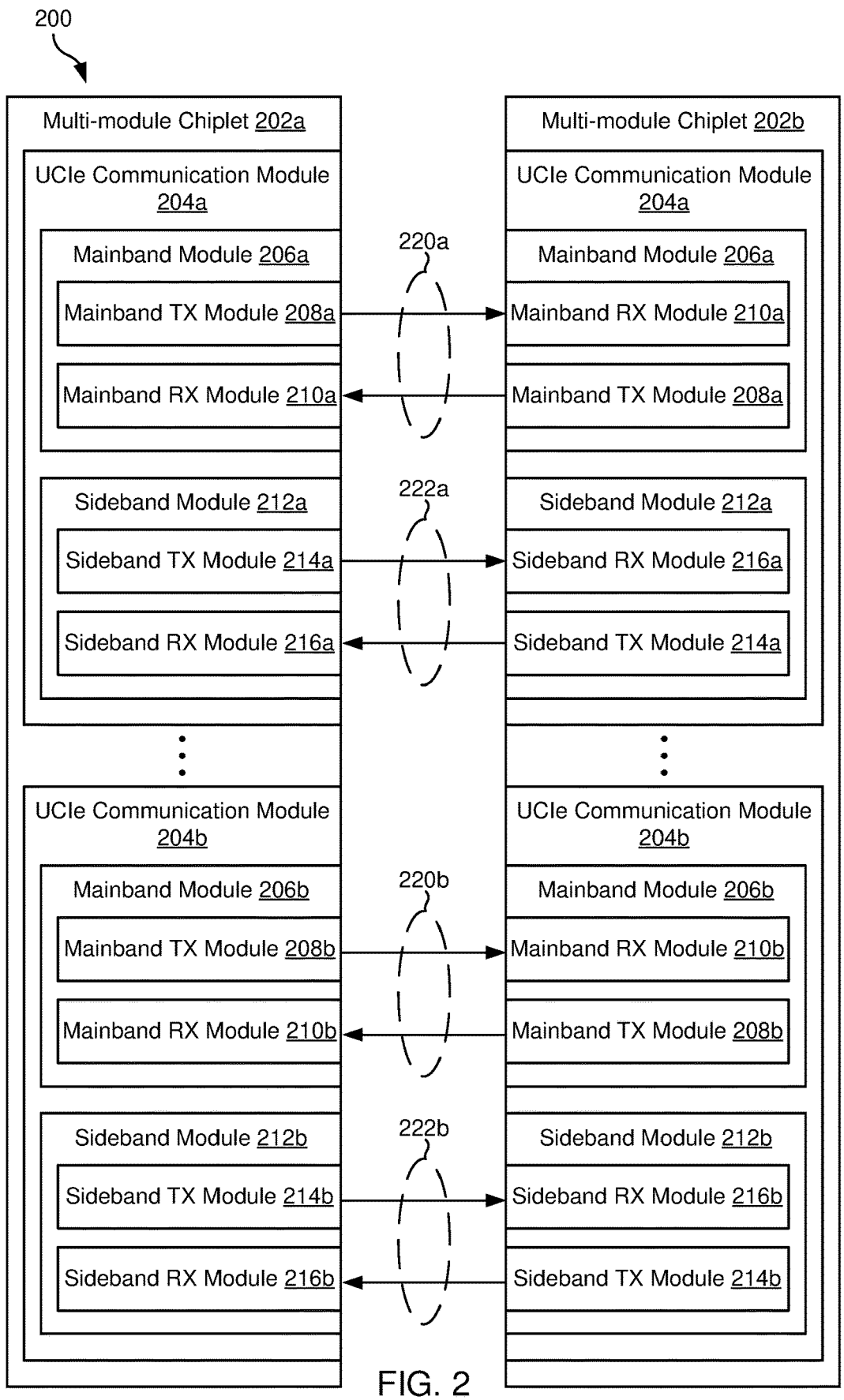
FIG. 2 is a component block diagram illustrating an example of a multi-module chiplet configuration of a Universal Chiplet Interconnect Express (UCIe) system of the computing device suitable for implementing various embodiments.

FIG. 2 illustrates an example multi-module chiplet configurations of a UCIe system 200 of the computing device (e.g., computing device 100 in FIG. 1) suitable for implementing various embodiments. With reference to FIGS. 1 and 2, the UCIe system 200 may include two or more multi-module chiplets 202a, 202b. The multi-module chiplet 202a, 202b may be integral to an SoC (e.g., SoC 102, 104 in FIG. 1). Each multi-module chiplet 202a, 202b may include two or more UCIe communication modules 204a, 204b.

Each UCIe communication module 204a, 204b may include components for implementing a UCIe link for communication with at least one other multi-module chiplet 202a, 202b according to UCIe protocols for multi-module chiplet configurations. For example, each UCIe communication module 204a, 204b may include components for implementing a mainband 220a, 220b of the UCIe link, such as a mainband module 206a, 206b having a mainband transmission (TX) module 208a, 208b and a mainband reception (RX) module 210a, 210b. The mainband transmission (TX) module 208a, 208b of one multi-module chiplet 202a, 202b may send transmissions via the mainband 220a, 220b that may be received by the mainband reception (RX) module 210a, 210b of another multi-module chiplet 202a, 202b. As another example, each UCIe communication module 204a, 204b may include components for implementing a sideband 222a, 222b of the UCIe link, such as a sideband module 212a, 212b having a sideband transmission (TX) module 214a, 214b and a sideband reception (RX) module 216a, 216b. The sideband transmission (TX) module 214a, 214b of one multi-module chiplet 202a, 202b may send transmissions via the sideband 222a, 222b that may be received by the sideband reception (RX) module 216a, 216b of another multi-module chiplet 202a, 202b.

Typically, only one sideband module 212a, 212b of any multi-module chiplet 202a, 202b may be activated for a UCIe link to implement one sideband 222a, 222b. That one sideband module 212a, 212b may be persistently activated for the UCIe link without modifying which of the two or more sideband modules 212a, 212b of the multi-module chiplet 202a, 202b may be activated. For example, the sideband module 212a of the multi-module chiplet 202a may be active and may enable the sideband 222a. At the same time, the sideband module 212b of the multi-module chiplet 202a may be inactive and may disable the sideband 222b.

Embodiments enable that the multi-module chiplet 202a, 202b may change which of the two or more sideband modules 212a, 212b may be activated for the UCIe link at runtime by selecting an inactive sideband module 212a, 212b to replace the active sideband module 212a, 212b. For example, the multi-module chiplet 202a may change the active sideband module from the sideband module 212a to the sideband module 212b, disabling sideband 222a and enabling sideband 222b.

Embodiments enable that the multi-module chiplet 202a, 202b may increase the number of active sideband modules 212a, 212b to more than one sideband module 212a, 212b, such as two or more sideband modules 212a, 212b, for the UCIe link at runtime by selecting at least one inactive sideband module 212a, 212b in addition to the active sideband module 212a, 212b. For example, the multi-module chiplet 202a may activate the sideband module 212b in addition to having the active sideband module 212a, enabling the sideband 222b in addition to the enabled sideband 222a.

The example illustrated in FIG. 2 shows two multi-module chiplets 202a, 202b each having two UCIe communication modules 204a, 204b and two sidebands 222a, 222b for clarity and ease of explanation, but does not limit the scope of the specification and claims to this number of multi-module chiplets, to this number of UCIe communication modules per multi-module chiplet, and to this number of sidebands per multi-module chiplet. One of skill in the art will realize that the descriptions of the UCIe system 200 with two multi-module chiplets 202a, 202b each having two UCIe communication modules 204a, 204b and two sidebands 222a, 222b are similarly applicable to UCIe system with more than two multi-module chiplets, to multi-module chiplets having more than two UCIe communication modules, and/or to multi-module chiplets having more than two sidebands.

Figure 3:
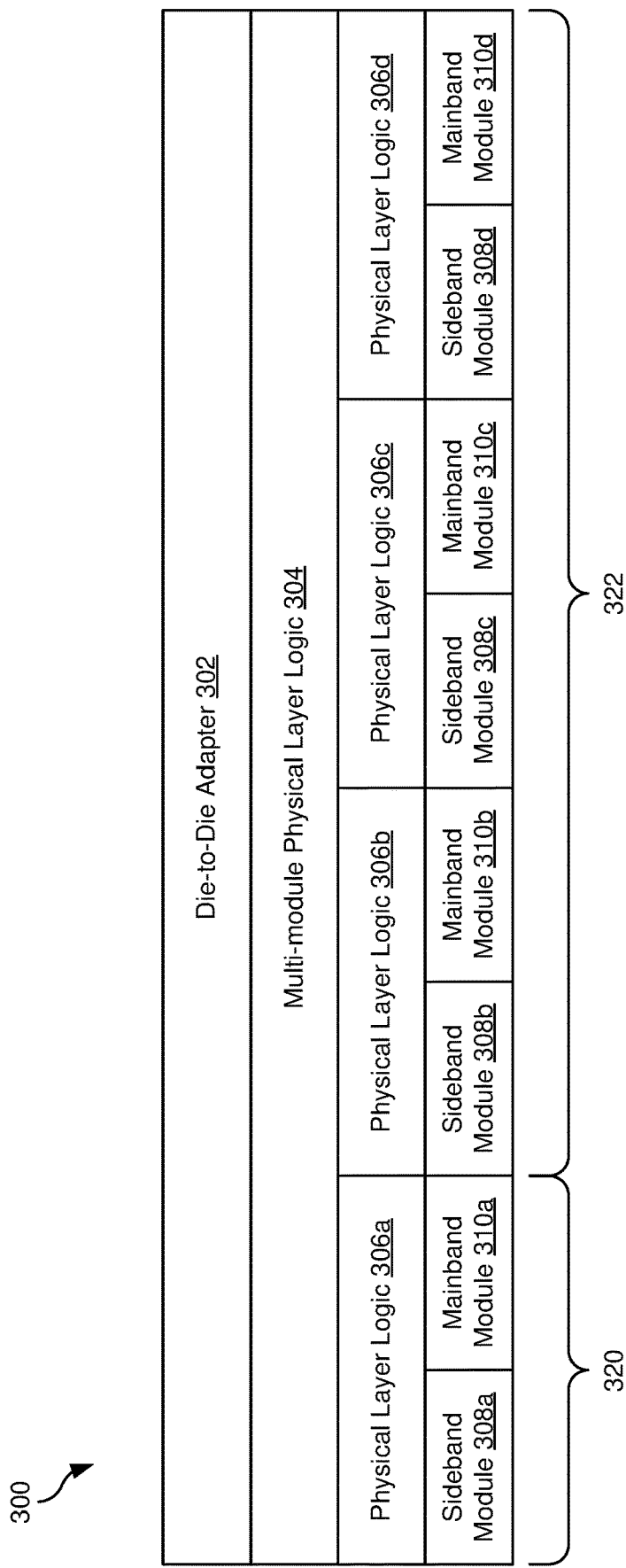
FIG. 3 is a component block diagram illustrating an example of a multi-module chiplet configuration of a chiplet configured for UCIe link sideband selection suitable for implementing various embodiments.

FIG. 3 illustrates an example of a multi-module chiplet configuration of a multi-module chiplet 300 (e.g., multi-module chiplet 202a, 202b in FIG. 2) configured for UCIe link sideband selection for implementing various embodiments. With reference to FIGS. 1-3, the multi-module chiplet 300 may be one of multiple multi-module chiplets 300 integral to an SoC (e.g., SoC 102, 104 in FIG. 1). The multi-module chiplet 300 may include a die-to-die adapter 302, a multi-module physical layer logic 304, two or more physical layer logics 306a, 306b, 306c, 306d (e.g., UCIe communications module 204a, 204b in FIG. 2), and a sideband module 308a, 308b, 308c, 308d (e.g., sideband module 212a, 212b in FIG. 2) and a mainband module 310a, 310b, 310c, 310d (e.g., mainband module 206a, 206b in FIG. 2) per physical layer logic 306a, 306b, 306c, 306d.

The die-to-die adapter 302 may be configured to implement link state management and parameter negotiation between multi-module chiplets 300. The die-to-die adapter 302 may also be configured to implement optional support for additional data reliability safeguards via cyclic redundancy checks and link-level retries.

The multi-module physical layer logic 304 may be configured to manage and implement the connections via interconnects between multi-module chiplets 300 of the same package. For example, the multi-module physical layer logic 304 may implement transmitting and receiving voltage signals representing commands and/or data between higher layers (not shown) of the multi-module chiplet 300 and the at least one of the two or more physical layer logics 306a, 306b, 306c, 306d of the multi-module chiplet 300. As another example, the multi-module physical layer logic 304 may manage to which and from which of the two or more physical layer logics 306a, 306b, 306c, 306d to transmit and/or receive voltage signals. For example, the multi-module physical layer logic 304 may transmit and/or receive voltage signals from at least one of the two or more physical layer logics 306a, 306b, 306c, 306d that is active, associated with an active sideband module 308a, 308b, 308c, 308d and/or an active mainband module 310a, 310b, 310c, 310d. In some embodiments, the multi-module physical layer logic 304 may implement UCIe link training using UCIe link sideband selection for which an active sideband module 308a, 308b, 308c, 308d may be changed at runtime, enabling and disabling the associated sidebands (e.g., sideband 222a, 222b FIG. 2) at runtime. In some embodiments, the multi-module physical layer logic 304 may implement UCIe link training using UCIe link sideband aggregation for which multiple active sideband modules 308a, 308b, 308c, 308d may be implemented at runtime, enabling the associated sidebands at runtime.

Each physical layer logic 306a, 306b, 306c, 306d may be configured to manage and implement the connections via interconnects between multi-module chiplets 300 of the same package. For example, each physical layer logic 306a, 306b, 306c, 306d may implement transmitting and receiving voltage signals representing commands and/or data between the multi-module physical layer logic 304 and the interconnects with other multi-module chiplets 300. An active physical layer logic 306a, 306b, 306c, 306d may transmit and/or receive voltage signals via an associated active sideband module 308a, 308b, 308c, 308d and/or an associated active mainband module 310a, 310b, 310c, 310d. In some embodiments, each physical layer logic 306a, 306b, 306c, 306d may implement UCIe link training using UCIe link sideband selection for which an active sideband module 308a, 308b, 308c, 308d may be changed at runtime, enabling and disabling the associated sidebands at runtime. In some embodiments, the multi-module physical layer logic 304 may implement UCIe link training using UCIe link sideband aggregation for which multiple active sideband modules 308a, 308b, 308c, 308d may be implemented at runtime, enabling the associated sidebands at runtime.

In the following example, a physical layer logic 306a, 306b, 306c, 306d and an associated sideband module 308a, 308b, 308c, 308d may be referred to interchangeably. The example is described in terms of sideband modules 308a, 308b, 308c, 308d for clarity and ease of explanation. In the example illustrated in FIG. 3, a UCIe link may be configured with a default enabled sideband by activating, by default, a sideband module 308a from a group of default sideband modules 320. In this example, the group of default sideband modules 320 includes a single sideband module 308a. The multi-module chiplet 300 may also include a group of functional, inactive sideband modules 322. In this example, the group of functional, inactive sideband modules 322 may include at least one of a remainder of sideband modules 308b, 308c, 308d of the multi-module chiplet 300. By implementing UCIe link training using UCIe link sideband selection, the UCIe link configuration may be changed from using this default enabled sideband to another enabled sideband by deactivating the sideband module 308a activated by default and activating one of the sideband modules 308b, 308c, 308d of the group of functional, inactive sideband modules 322. Similarly, further configurations of the UCIe link may again change enabled sidebands by enabling any of the disabled, functional sideband modules 308a, 308b, 308c, 308d from the group of default sideband modules 320 and the group of functional, inactive sideband modules 322.

In the following examples described with reference to FIGS. 4-6, a sideband module (e.g., sideband module 212a, 212b in FIG. 2, sideband module 308a, 308b, 308c, 308d in FIG. 3) and an associated sideband (e.g., sideband 222a, 222b) may be referred to interchangeably. The examples are described in terms of sidebands for clarity and ease of explanation.

Figures 4, 5, 6:
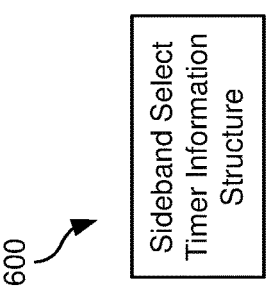
FIG. 4 is a component block and information structure diagram illustrating an example of a sideband select information structure for UCIe link sideband selection suitable for implementing various embodiments.
FIG. 5 is an information structure diagram illustrating an example information structure for implementing UCIe link sideband selection according to an embodiment.
FIG. 6 is a component block and information structure diagram illustrating an example of a sideband select timer information structure for UCIe link sideband selection suitable for implementing various embodiments.

FIG. 4 illustrates an example of a sideband select information structure 400 for UCIe link sideband selection suitable for implementing various embodiments. With reference to FIGS. 1-4, the sideband select information structure 400 may be configured to store data for implementing UCIe link sideband selection. In some embodiments, the sideband select information structure 400 may be and/or may be stored at a memory (e.g., memory 120, 158 in FIG. 1), such as a sideband select register. The sideband select information structure 400 may be persistent, or sticky, such that the sideband select information structure 400 may retain data through a reset state of a UCIe link training process. The sideband select information structure 400 may be a component of a multi-module chiplet (e.g., multi-module chiplet 202a, 202b in FIG. 2, multi-module chiplet 300 in FIG. 3). The sideband select information structure 400 may be accessible by a UCIe communications module (e.g., UCIe communications module 204a, 204b in FIG. 2), a multi-module physical layer logic (e.g., multi-module physical layer logic 304 in FIG. 3), and/or a physical layer logic (e.g., physical layer logic 306a, 306b, 306c, 306d in FIG. 3).

The sideband select information structure 400 may include at least one active sideband data (e.g., active sideband 1, active sideband 0) and at least two functional sideband data (e.g., functional sideband 3, functional sideband 2, functional sideband 1, functional sideband 0). The functional sideband data may be configured to represent which sidebands of the multi-module chiplet are functional.

For example, each sideband may be associated with a location in the sideband select information structure 400, and the value at the location may represent whether the associated sideband is functional. As a non-limiting example, a value of "1" at a location in the sideband select information structure 400 may indicate the associated sideband is functional and a value of "0" at the location in the sideband select information structure 400 may indicate the associated sideband is not functional. Thus in this example, if functional sideband 2="0" and functional sideband 0, functional sideband 1, and functional sideband 3 each="1", then sideband 2 is not functional and sidebands 0, 1, and 3 are functional. As another example, each sideband and/or combination of sidebands may be associated with a value, and the value at a location in the sideband select information structure 400 may represent the sideband(s) associated with the value as a functional sideband(s). As a non-limiting example, for four sidebands the value may be from 0 to 15, where different values correspond to different combinations of functional sideband, such as: if value="3", then sideband 2 is functional and sidebands 0, 1, and 3 are not functional; if value="6", then sidebands 0 and 2 are functional and sidebands 1 and 3 are not functional; if value="13", then sidebands 0, 2, and 3 are functional and sideband 1 is not functional; etc.

The active sideband data may be configured to represent which functional sideband is the active, or enabled, sideband. For example, the active sideband data may be one or more data for which different values may be associated with different functional sidebands. As another example, the active sideband data may be one or more data for which different values may be associated with different locations of functional sideband data at the sideband select information structure 400.

An example of how the active sideband data may relate to the functional sideband data is illustrated in FIG. 5. With reference to FIGS. 1-5, a table 500 illustrates an example of how different values of two active sideband data (e.g., active sideband 1, active sideband 0) may represent which of the functional sidebands, represented by functional sideband data (e.g., functional sideband 3, functional sideband 2, functional sideband 1, functional sideband 0), is the active sideband. For example: active sideband data of values "00" may represent functional sideband 0 as the active sideband; active sideband data of values "01" may represent functional sideband 1 as the active sideband; active sideband data of values "10" may represent functional sideband 2 as the active sideband; and active sideband data of values "11" may represent functional sideband 3 as the active sideband. In some embodiments, one of the values of active sideband data may be a default value at the sideband select information structure 400 resulting in activating the associated functional sideband by default.

In some embodiments, the sideband select information structure 400 may include a sideband select enable data for which different values may represent whether the multi-module chiplet may implement UCIe link sideband selection. For example, the sideband select enable data having a value enabling UCIe link sideband selection may enable the multi-module chiplet to implement UCIe link sideband selection. Alternatively, the sideband select enable data having a value disabling UCIe link sideband selection may disable the multi-module chiplet from implementing UCIe link sideband selection.

In some embodiments, a software and/or firmware executed by the multi-module chiplet may write data to the sideband select information structure 400. For example, the software and/or firmware may write values of the active sideband data to the sideband select information structure 400. The software and/or firmware may be configured to implement a process for UCIe link sideband selection based on any combination of criteria, such as a measure, estimation, and/or requirement of a level data integrity for UCIe communication between multi-module chiplets.

The software and/or firmware may write values of the active sideband data to indicate which functional sideband to select for a next UCIe link training. The values of the active sideband data written by the software and/or firmware may be different from the values previously at the active sideband data, resulting in a different functional sideband than a current active sideband being activated during the next UCIe link training.

The multi-module chiplet may read the values of the active sideband data during the next UCIe link training and train the UCIe link including activating the functional sideband represented by the values of the active sideband data. In some embodiments, reading the values of the active sideband and training the UCIe link including activating the functional sideband represented by the values of the active sideband data may be implemented by a UCIe communications module, a multi-module physical layer logic, and/or a physical layer logic.

The examples illustrated in FIGS. 3-5 show four sideband modules 308a, 308b, 308c, 308d and/or four sidebands per multi-module chiplet 300 for clarity and ease of explanation, but do not limit the scope of the specification and claims to this number of sideband modules and to this number of sidebands per multi-module chiplet. One of skill in the art will realize that the descriptions of the examples with four sideband modules 308a, 308b, 308c, 308d and/or four sidebands per multi-module chiplet 300 are similarly applicable to any number greater than one, such as two or eight, of sideband modules and/or sidebands per multi-module chiplet.

FIG. 6 illustrates an example of a sideband select timer information structure 600 for UCIe link sideband selection suitable for implementing various embodiments. With reference to FIGS. 1-6, the sideband select timer information structure 600 may be configured to store data for implementing UCIe link sideband selection. In some embodiments, the sideband select timer information structure 600 may be and/or may be stored at a memory (e.g., memory 120, 158 in FIG. 1), such as a sideband select timer. The sideband select timer information structure 600 may be a component of a multi-module chiplet (e.g., multi-module chiplet 202a, 202b in FIG. 2, multi-module chiplet 300 in FIG. 3). The sideband select timer information structure 600 may be accessible by a UCIe communications module (e.g., UCIe communications module 204a, 204b in FIG. 2), a multi-module physical layer logic (e.g., multi-module physical layer logic 304 in FIG. 3), and/or a physical layer logic (e.g., physical layer logic 306a, 306b, 306c, 306d in FIG. 3).

The sideband select timer information structure 600 may be configured to store as data a sideband select timer value that may be periodically, continuously, and/or episodically incremented and/or decremented. In some embodiments, a software and/or firmware executed by the multi-module chiplet may write sideband select timer data to the sideband select timer information structure 600. For example, the software and/or firmware may write the sideband select timer value to the sideband select timer information structure 600. The software and/or firmware may be configured to implement a process for UCIe link sideband selection based on any combination of criteria, such as a measure, estimation, and/or requirement of a level of data integrity for UCIe communication between multi-module chiplets. The software and/or firmware may write the sideband select timer value to indicate when to implement a next UCIe link training implementing UCIe link sideband selection.

A threshold sideband select timer value may trigger UCIe link training implementing UCIe link sideband selection. In some embodiments, the multi-module chiplet may read the sideband select timer value, and, based on the sideband select timer value, decide (e.g., determine or take an action) to implement UCIe link training, which may implement UCIe link sideband selection based on data of a sideband select information structure (e.g., sideband select information structure 400 in FIG. 4). In some embodiments, reading the sideband select timer value and deciding (e.g., determining or taking an action) to implement UCIe link training may be implemented by a UCIe communications module, a multi-module physical layer logic, and/or a physical layer logic.

Figure 7:
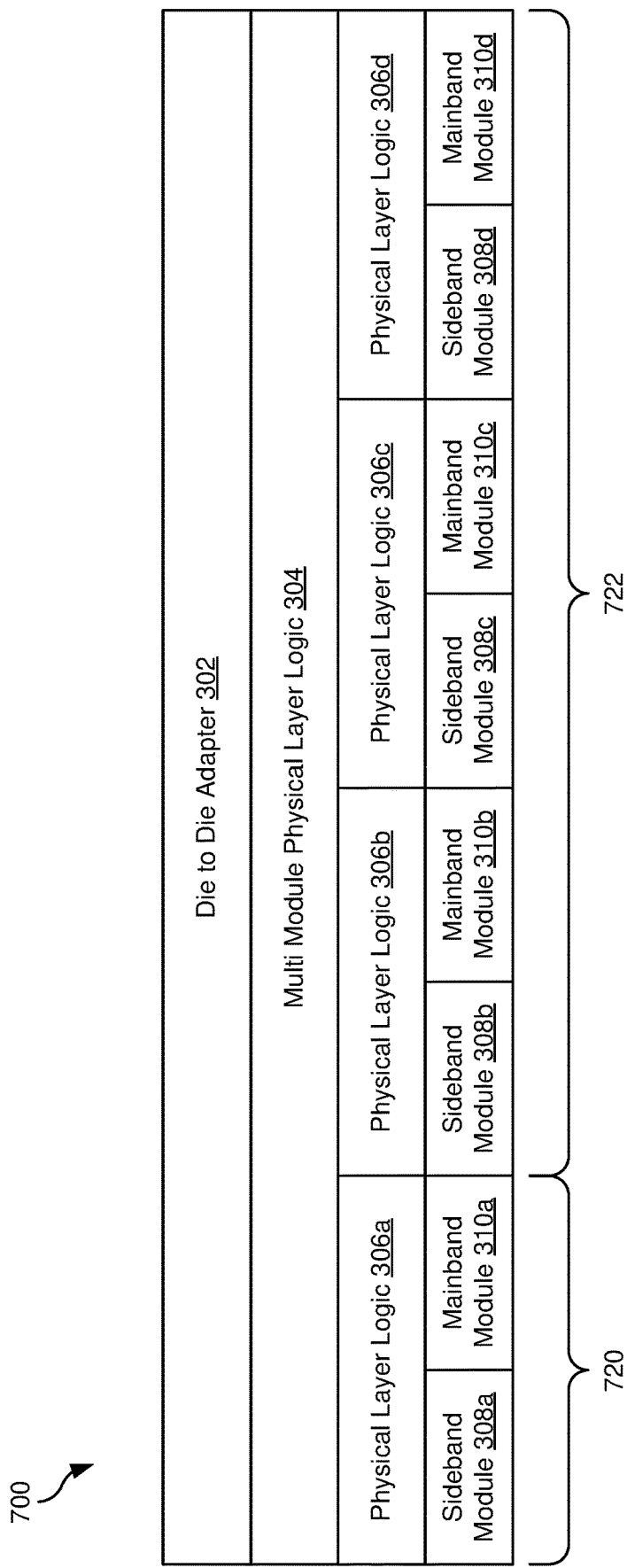
FIG. 7 is a component block diagram illustrating an example of a multi-module chiplet configuration of a UCIe communication module configured for UCIe link sideband aggregation suitable for implementing various embodiments.

FIG. 7 illustrates an example of a multi-module chiplet configuration of a chiplet 700 (e.g., multi-module chiplet 202a, 202b in FIG. 2, multi-module chiplet 300 in FIG. 3) configured for UCIe link sideband aggregation for implementing various embodiments. With reference to FIGS. 1-7, the multi-module chiplet 700 may be one of multiple multi-module chiplets 700 integral to an SoC (e.g., SoC 102, 104 in FIG. 1). The multi-module chiplet 700 may include a die-to-die adapter 302, a multi-module physical layer logic 304, two or more physical layer logics 306a, 306b, 306c, 306d (e.g., UCIe communications module 204a, 204b in FIG. 2), and a sideband module 308a, 308b, 308c, 308d (e.g., sideband module 212a, 212b in FIG. 2) and a mainband module 310a, 310b, 310c, 310d (e.g., mainband module 206a, 206b in FIG. 2) per physical layer logic 306a, 306b, 306c, 306d. The die-to-die adapter 302, the multi-module physical layer logic 304, the two or more physical layer logics 306a, 306b, 306c, 306d, the sideband modules 308a, 308b, 308c, 308d, and the mainband modules 310a, 310b, 310c, 310d may be configured as described herein for the same reference numbered components with reference to FIG. 3.

In the following example, a physical layer logic 306a, 306b, 306c, 306d and an associated sideband module 308a, 308b, 308c, 308d may be referred to interchangeably. The example is described in terms of sideband modules 308a, 308b, 308c, 308d for clarity and ease of explanation. In the example illustrated in FIG. 7, a UCIe link may be configured with a default enabled sideband by activating, by default, a sideband module 308a from a group of default sideband modules 720. In this example, the group of default sideband modules 720 includes a single sideband module 308a. The multi-module chiplet 700 may also include a group of functional, inactive sideband modules 722. In this example, the group of functional, inactive sideband modules 722 may include at least one of a remainder of sideband modules 308b, 308c, 308d of the multi-module chiplet 700. By implementing UCIe link training using UCIe link sideband aggregation, the UCIe link configuration may be changed from using only this default enabled sideband to using the default enabled sideband and at least one other enabled sideband by activating at least one of the sideband modules 308b, 308c, 308d of the group of functional, inactive sideband modules 722. By implementing UCIe link training using UCIe link sideband aggregation, the UCIe link configuration may be changed from using only this default enabled sideband to using at least two enabled sidebands by activating at least two of the sideband modules 308b, 308c, 308d of the group of functional, inactive sideband modules 722 and deactivating the default enabled sideband. Similarly, further configurations of the UCIe link may again change enabled sidebands by enabling any combination of the disabled, functional sideband modules 308b, 308c, 308d from the group of functional, inactive sideband modules 722.

In the following examples described with reference to FIGS. 8 and 9, a sideband module (e.g., sideband module 212a, 212b in FIG. 2, sideband module 308a, 308b, 308c, 308d in FIG. 3) and an associated sideband (e.g., sideband 222a, 222b) may be referred to interchangeably. The examples are described in terms of sidebands for clarity and ease of explanation.

Figures 8, 9:
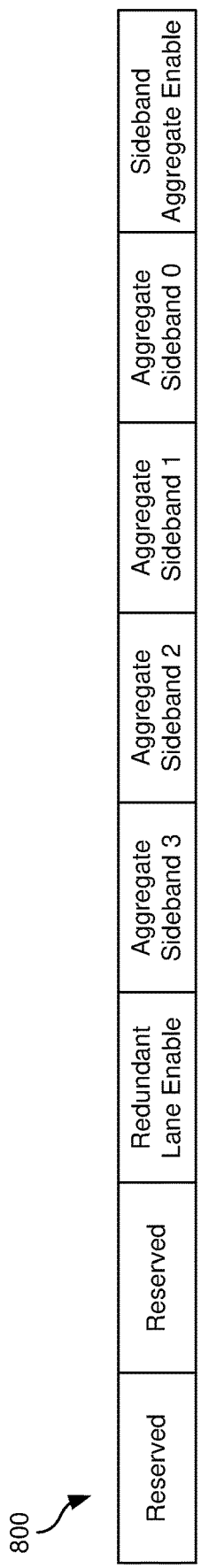
FIG. 8 is a component block and information structure diagram illustrating an example of a sideband aggregate information structure for UCIe link sideband aggregation suitable for implementing various embodiments.
FIG. 9 is a component block and information structure diagram illustrating an example of a sideband aggregate timer information structure for UCIe link sideband aggregation suitable for implementing various embodiments.

FIG. 8 illustrates an example of a sideband aggregate information structure 800 for UCIe link sideband aggregation suitable for implementing various embodiments. With reference to FIGS. 1-8, the sideband aggregate information structure 800 may be configured to store data for implementing UCIe link sideband aggregation. In some embodiments, the sideband aggregate information structure 800 may be and/or may be stored at a memory (e.g., memory 120, 158 in FIG. 1), such as a sideband aggregation register. The sideband aggregate information structure 800 may be persistent, or sticky, such that the sideband aggregate information structure 800 may retain data through a reset state of a UCIe link training process. The sideband aggregate information structure 800 may be a component of a multi-module chiplet (e.g., multi-module chiplet 202a, 202b in FIG. 2, multi-module chiplet 300, 700 in FIGS. 3 and 7). The sideband aggregate information structure 800 may be accessible by a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

The sideband aggregate information structure 800 may include at least two aggregate sideband data (e.g., aggregate sideband 3, aggregate sideband 2, aggregate sideband 1, aggregate sideband 0). The aggregate sideband data may be configured to represent which sidebands of the multi-module chiplet are active, enabled, and/or are functional. For example, when implementing UCIe link sideband aggregation, at least two, such as two and/or four, sidebands of the multi-module chiplet may be aggregated or concurrently active, and the aggregate sideband data of the sideband aggregate information structure 800 may be configured to indicate to the multi-module chiplet which of the sidebands are active.

For example, each sideband may be associated with a location in the sideband aggregate information structure 800. The aggregate sideband data at each location may be configured to represent which sideband is an active, or enabled, sideband based on an association of the location with sideband and a value of the aggregate sideband data at the location. For example, the aggregate sideband data may be data for which different values may represent an active state or an inactive state of the sideband associated with the location of the aggregate sideband data in the sideband aggregate information structure 800. As a non-limiting example, a value of "1" at locations in the sideband aggregate information structure 800 may indicate the associated sideband is active and a value of "0" at the locations in the sideband aggregate information structure 800 may indicate the associated sideband is not active. In this example, if aggregate sideband 1 and aggregate sideband 2 each="0" and aggregate sideband 0 and aggregate sideband 3 each="1", then sidebands 1 and 2 are not active and sidebands 0 and 3 are active.

In some embodiments, each sideband and/or combination of sidebands may be associated with a value, and the value at a location in the sideband aggregate information structure 800 may represent the sideband(s) associated with the value as an active sideband(s). As a non-limiting example, for four sidebands the value may be from 0 to 11, where different values correspond to different combinations of functional sideband, such as: if value="3", then sideband 2 is active and sidebands 0, 1, and 3 are not active; if value="6", then sidebands 0 and 2 are active and sidebands 1 and 3 are not active; if value="0", then sidebands 2 and 3 are active and sidebands 0 and 1 are not active; if value="11", then sidebands 0, 1, 2 and 3 are active.

In some embodiments, the sideband aggregate information structure 800 may include functional sidebands and may exclude nonfunctional side sidebands. In some embodiments, the sideband aggregate information structure 800 may include nonfunctional side sidebands that may be associated with locations in the sideband aggregate information structure 800 that may be prevented from being set with a value of aggregate sideband data configured to represent an active state.

For example, any two or more, such as four, functional sidebands may be aggregated, or active at the same time. Values of the aggregate sideband data at the two or more locations of the sideband aggregate information structure 800 may be set to represent an active state for the functional associated sidebands. In some embodiments, a value of the aggregate sideband data at one of the locations of the sideband aggregate information structure 800 may be a default value resulting in activating the associated functional sideband by default. Values of the aggregate sideband data at any one or more, such as three, other locations of the sideband aggregate information structure 800 may be set to represent an active state of the associated functional sidebands. In some embodiments, the default value may be modified to be set to represent an inactive state of the associated functional sideband, and two or more other locations of the sideband aggregate information structure 800 may be set with values of the aggregate sideband data to represent an active state of the associated functional sidebands.

In some embodiments, the sideband aggregate information structure 800 may include a sideband aggregate enable data for which different values may represent whether the multi-module chiplet may implement UCIe link sideband aggregation. For example, the sideband aggregate enable data having a value enabling UCIe link sideband aggregation may enable the multi-module chiplet to implement UCIe link sideband aggregation. Alternatively, the sideband aggregate enable data having a value disabling UCIe link sideband aggregation may disable the multi-module chiplet from implementing UCIe link sideband aggregation.

In some embodiments, the sideband aggregate information structure 800 may include a redundant lane enable data for which different values may represent whether the multi-module chiplet may implement redundant lanes for a UCIe link. For example, the multi-module chiplet may be configured as an advanced package with redundant lane capabilities. The redundant lane enable data having a value enabling redundant lanes for the UCIe link may enable the multi-module chiplet to implement redundant lanes for the UCIe link, such as part of a mainband of the UCIe link. Alternatively, the redundant lane enable data having a value disabling redundant lanes for the UCIe link may disable the multi-module chiplet from implementing redundant lanes for the UCIe link.

In some embodiments, a software and/or firmware executed by the multi-module chiplet may write data to the sideband aggregate information structure 800. For example, the software and/or firmware may write values of the aggregate sideband data to the sideband aggregate information structure 800. The software and/or firmware may be configured to implement a process for UCIe link sideband aggregation based on any combination of criteria, such as for firmware loading, patch downloading, configuration update/management, security protocol and data module (SPDM) information exchange, other management activities, etc. between multi-module chiplets. The software and/or firmware may write values of the aggregate sideband data to indicate which functional sidebands to select for a next UCIe link training. The values of the aggregate sideband data written by the software and/or firmware may be different from the values previously at the aggregate sideband data, resulting in a different combination of functional sidebands than one or more current active sidebands being activated during the next UCIe link training. The multi-module chiplet may read the values of the aggregate sideband data during the next UCIe link training and train the UCIe link including activating the combination of functional sidebands represented by the values of the aggregate sideband data. In some embodiments, reading the values of the aggregate sideband data and training the UCIe link including activating the combination of functional sidebands represented by the values of the aggregate sideband data may be implemented by a UCIe communications module, a multi-module physical layer logic, and/or a physical layer logic.

The examples illustrated in FIGS. 7 and 8 show four sideband modules 308a, 308b, 308c, 308d and/or four sidebands per multi-module chiplet 700 for clarity and ease of explanation, but do not limit the scope of the specification and claims to this number of sideband modules and to this number of sidebands per multi-module chiplet. One of skill in the art will realize that the descriptions of the examples with four sideband modules 308a, 308b, 308c, 308d and/or four sidebands per multi-module chiplet 700 are similarly applicable to any number greater than one, such as two or eight, of sideband modules and/or sidebands per multi-module chiplet.

FIG. 9 illustrates an example of a sideband aggregate timer information structure 900 for UCIe link sideband aggregation suitable for implementing various embodiments. With reference to FIGS. 1-9, the sideband aggregate timer information structure 900 may be configured to store data for implementing UCIe link sideband aggregation. In some embodiments, the sideband aggregate timer information structure 900 may be and/or may be stored at a memory (e.g., memory 120, 158 in FIG. 1), such as a sideband aggregate timer. The sideband aggregate timer information structure 900 may be a component of a multi-module chiplet (e.g., multi-module chiplet 202a, 202b in FIG. 2, multi-module chiplet 300, 700 in FIGS. 3 and 7). The sideband aggregate timer information structure 900 may be accessible by a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

The sideband aggregate timer information structure 900 may be configured to store as data a sideband aggregate timer value that may be periodically, continuously, and/or episodically incremented and/or decremented. In some embodiments, a software and/or firmware executed by the multi-module chiplet may write sideband aggregate timer data to the sideband aggregate timer information structure 900. For example, the software and/or firmware may write the sideband aggregate timer value to the sideband aggregate timer information structure 900. The software and/or firmware may be configured to implement a process for UCIe link sideband aggregation based on any combination of criteria, such as a measure, estimation, and/or requirement of a level of data integrity for UCIe communication between multi-module chiplets. The software and/or firmware may write the sideband aggregate timer value to indicate when to implement a next UCIe link training implementing UCIe link sideband aggregation.

A threshold sideband aggregate timer value may trigger UCIe link training implementing UCIe link sideband aggregation. In some embodiments, the multi-module chiplet may read the sideband aggregate timer value, and based on the sideband aggregate timer value, decide (e.g., determine or take an action) to implement UCIe link training, which may implement UCIe link sideband aggregation based on data of a sideband aggregate information structure (e.g., sideband aggregate information structure 800 in FIG. 8). In some embodiments, reading the sideband aggregate timer value and deciding (e.g., determining or taking an action) to implement UCIe link training may be implemented by a UCIe communications module, a multi-module physical layer logic, and/or a physical layer logic.

Figure 10:
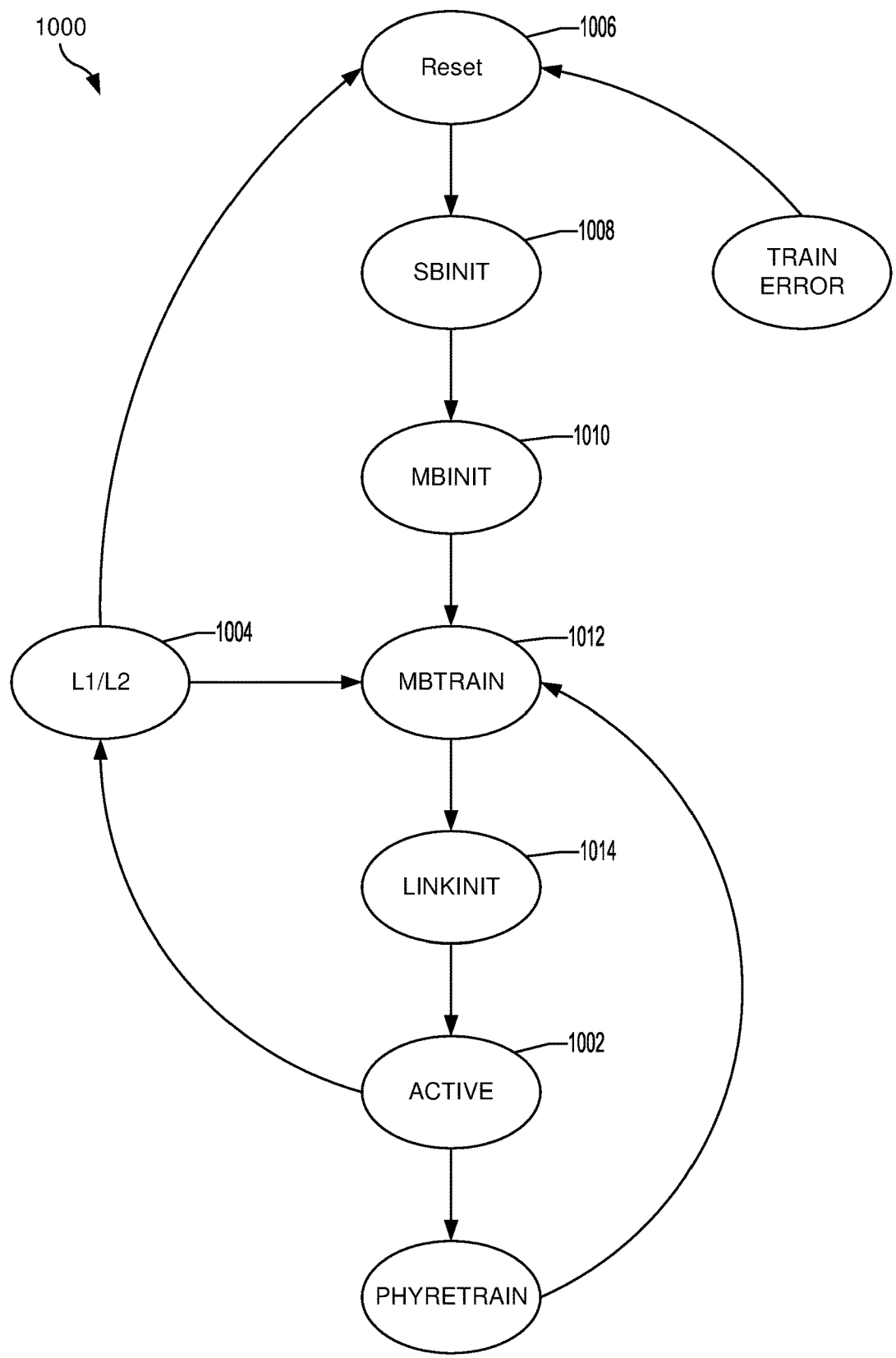
FIG. 10 is a graph flow diagram illustrating an example UCIe link training status and state machine suitable for implementing various embodiments.

FIG. 10 illustrates an example UCIe link training status and state machine (LTSSM) 1000 suitable for implementing various embodiments. With reference to FIGS. 1-10, the UCIe LTSSM 1000 may be implemented for UCIe link training, including transitions between states of the LTSSM 1000, by a multi-module chiplet (e.g., multi-module chiplet 202a, 202b in FIG. 2, multi-module chiplet 300, 700 in FIGS. 3 and 7), including by a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

During the active state 1002 ("active") of a UCIe link, the UCIe link may be previously initialized and the UCIe communications module and/or components of the UCIe communications module may be powered and enabled to send and receive transactions via the UCIe link. Also during the active state 1002, a multi-module chiplet of the UCIe link executing a software and/or firmware may receive a sideband configuration signal from the software and/or firmware. The sideband configuration signal may include sideband configuration data (e.g., active sideband data and/or sideband select enable data; aggregate sideband data, sideband aggregate enable data, and/or redundant lane enable data). Receiving the sideband configuration signal may prompt the multi-module chiplet to write the sideband configuration data to a sideband configuration information structure (e.g., sideband select information structure 400 in FIG. 4, sideband aggregate information structure 800 in FIG. 8). In some embodiments, the sideband configuration signal may include sideband configuration timer data (e.g., sideband select timer data, sideband aggregate timer data). Receiving the sideband configuration signal may prompt the multi-module chiplet to write the sideband configuration timer data to a sideband configuration timer information structure (e.g., sideband select timer information structure 600 in FIG. 6, sideband aggregate timer information structure 900 in FIG. 9).

The UCIe link may transition from the active state to a low power state 1004 ("L1/L2"). During the low power state 1004, power provided to the UCIe communications module and/or components of the UCIe communications module may be lowered to a level such that the UCIe link may be inactive or no longer initialized and transactions may not be sent or received via the UCIe link. The power provided to the UCIe communications module and/or components of the UCIe communications module may be lowered to a level also sufficient to maintain data relating to previous initialization of one or more sidebands, including sideband configuration data, and a mainband of the UCIe link. The power provided to the UCIe communications module and/or components of the UCIe communications module may be lowered relative to power provided during the active state 1002. The UCIe link may transition from the active state 1002 to the low power state 1004 periodically and/or episodically during normal operation. In some embodiments, the sideband configuration timer information structure may be implemented to ensure that the UCIe link transition from the active state to the low power state occurs within a designated period, which may be related to the sideband configuration timer data written to the sideband configuration timer information structure. For example, the sideband configuration timer data may set value at the sideband configuration timer information structure to use as the period. The sideband configuration timer information structure may time the period and be configured to identify that the period has elapsed. In some embodiments, the sideband configuration timer information structure may identify the period has elapsed actively, such as by issuing a sideband configuration timer signal to the multi-module chiplet configured to represent that the period has elapsed and that may prompt the multi-module chiplet to transition the UCIe link from the active state to the low power state. In some embodiments, the sideband configuration timer information structure may identify the period has elapsed passively, such as by retaining a value configured to indicate to the multi-module chiplet that the period has elapsed and the multi-module chiplet may be prompted to transition the UCIe link from the active state to the low power state based on reading the retained value at the sideband configuration timer information structure.

The UCIe link may transition from the low power state 1004 to a reset state 1006 ("reset"). During the reset state 1006, the UCIe link may be reset. For example, the UCIe link may be reset by clearing data relating to the UCIe link from the UCIe communications module and/or components of the UCIe communications module and/or interrupting the connection of the UCIe link. Clearing the data relating to the data relating to the UCIe link and/or interrupting the connection of the UCIe link may involve toggling power to the UCIe communications module and/or components of the UCIe communications module. The sideband configuration information structure may be persistent, or sticky, such that the sideband configuration information structure may retain the sideband configuration data through the reset state.

The UCIe link may transition from the reset state 1006 to a sideband initialize state 1008 ("sbinit"). During the sideband initialize state 1008 the multi-module chiplet may use the sideband configuration data from the sideband configuration information structure to initialize, or activate or enable, one or more sidebands. In some embodiments, the multi-module chiplet implementing UCIe link sideband selection may initialize a sideband different from a sideband that was active prior to the reset state based on the sideband configuration data. In some embodiments, the multi-module chiplet implementing UCIe link sideband aggregation may initialize two or more sidebands, such as four, which may include a combination of a sideband that was active and at least one sideband that was inactive prior to the reset state, and/or at least two sidebands different from the sideband that was active prior to the reset state, based on the sideband configuration data.

The UCIe link may transition from the sideband initialize state 1008 to a mainband initialize state 1010 ("mbinit"), to a mainband train state 1012 ("mbtrain"), to a UCIe link initialize state 1014 ("linkinit"), and to the active state 1002 ("active"). The multi-module chiplet may implemented the UCIe link in the active state 1002 using the one or more sidebands initialized during the sideband initialize state.

In some embodiments, the LTSSM 1000 may also include a physical layer retrain ("phyretrain") state for retraining the UCIe link and a train error ("trainerror") state for handling an error during UCIe link training.

Figure 11A:
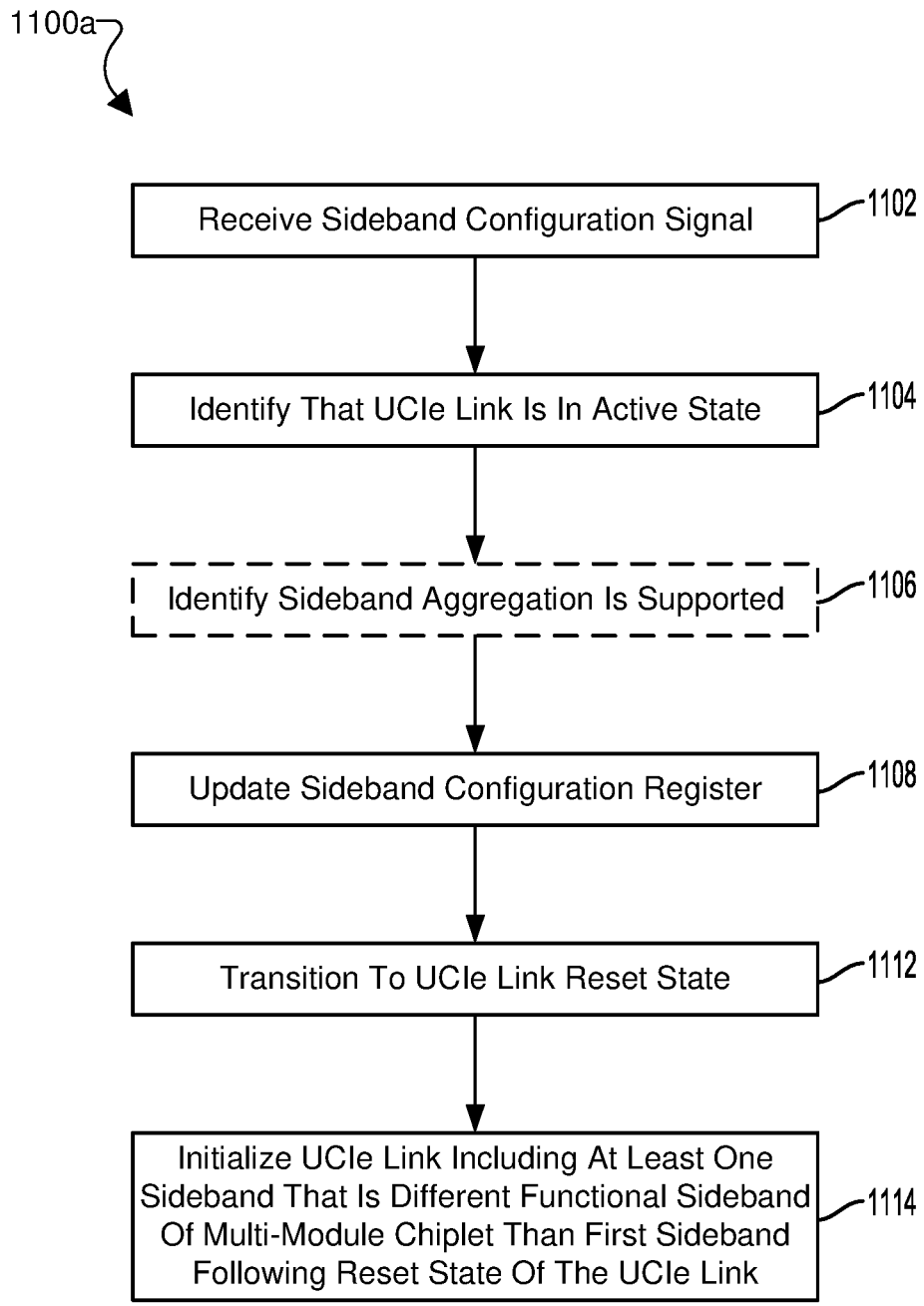
FIGS. 11A-11C are process flow diagrams illustrating example methods for implementing multi-module chiplet configured UCIe link sideband configuration according to an embodiment.
Figure 11B:
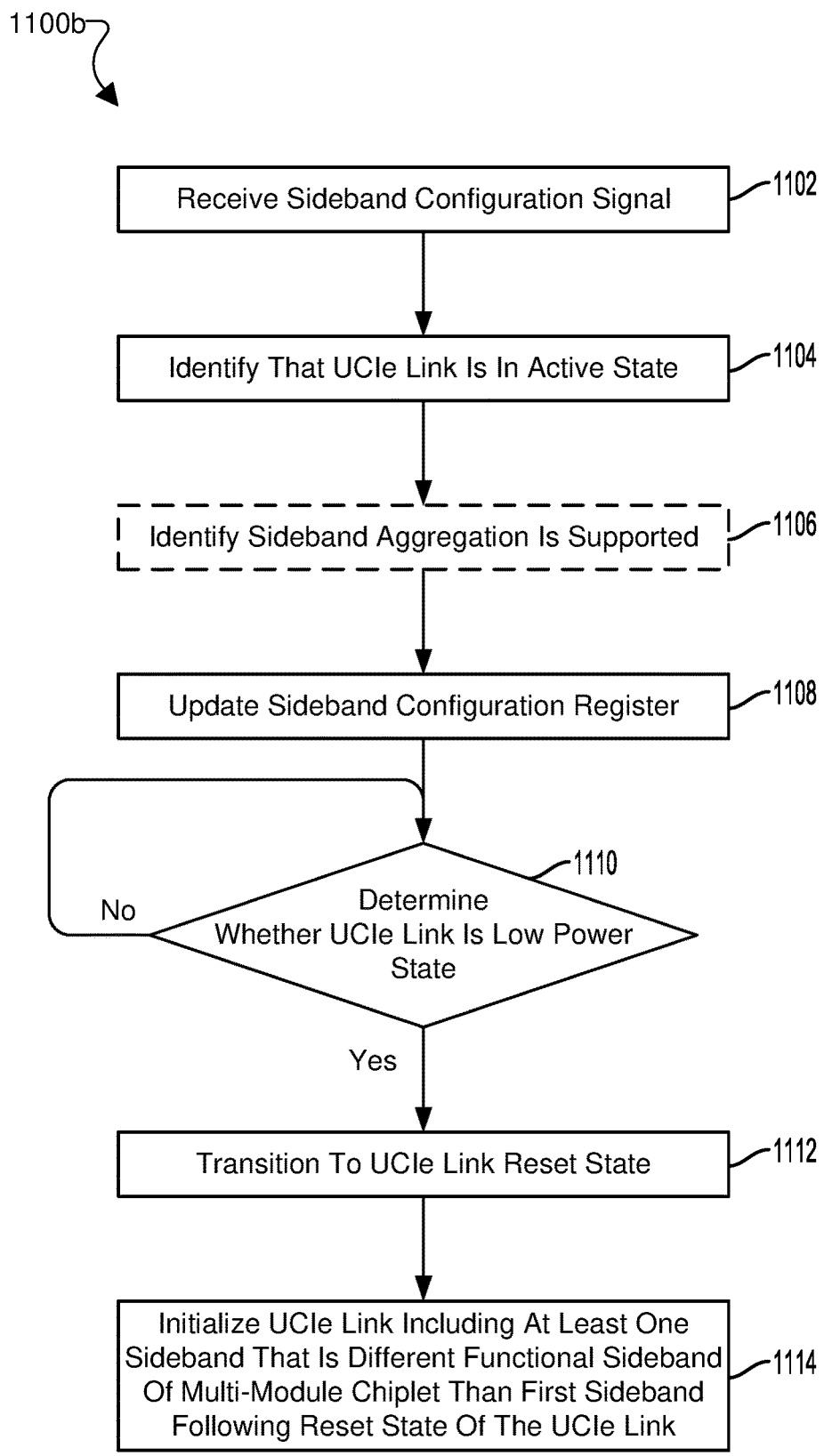
Figure 11C:
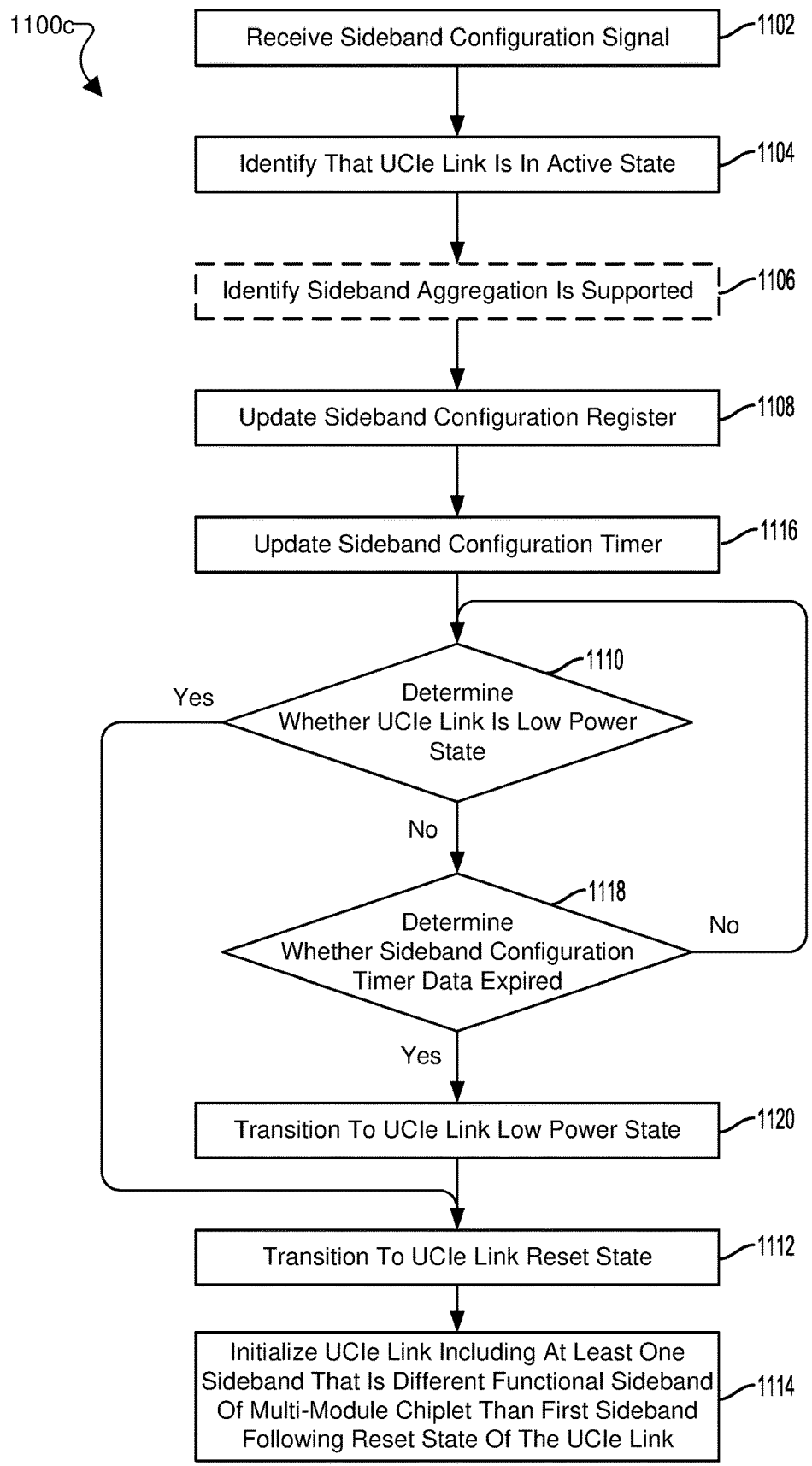

FIGS. 11A-11C illustrate example methods 1100*a*, 1100*b*, 1100*c* for implementing multi-module chiplet configured UCIe link sideband configuration according to various embodiments. With reference to FIGS. 1-11C, the methods 1100*a*, 1100*b*, 1100*c* may be implemented in a computing device (e.g., computing device 100, SoC 102, 104 in FIG. 1, UCIe system 200 in FIG. 2), in hardware (e.g., UCIe communications module 204*a*, 204*b* in FIG. 2, multi-module physical layer logic 304, physical layer logic 306*a*, 306*b*, 306*c*, 306*d* in FIGS. 3 and 7), in software (e.g., UCIe communications module 204*a*, 204*b* in FIG. 2, multi-module physical layer logic 304, physical layer logic 306*a*, 306*b*, 306*c*, 306*d* in FIGS. 3 and 7) executing in a processor (e.g., multi-module chiplet 202*a*, 202*b*, 300, 700 in FIGS. 2, 3, and 7), or in a combination of a software-configured processor and dedicated hardware (e.g., multi-module chiplet 202*a*, 202*b*, 300, 700 in FIGS. 2, 3, and 7), that includes other individual components, such as various memories/caches (e.g., sideband select information structure 400 in FIG. 4, sideband select timer information structure 600 in FIG. 6, sideband aggregate information structure 800 in FIG. 8, sideband aggregate timer information structure 900 in FIG. 9) and various memory/cache controllers. In order to encompass the alternative configurations enabled in various embodiments, the hardware implementing the methods 1100*a*, 1100*b*, 1100*c* is referred to herein as a "UCIe link configuration device."

Blocks 1102-1114 of the methods 1100*a*, 1100*b*, 1100*c* described with reference to FIGS. 11A-11C may be implemented in a similar manner and are described in detail once for the methods 1100*a*, 1100*b*, 1100*c* unless otherwise specified.

With reference to FIG. 11A, in the method 1100*a*, in block 1102, the UCIe link configuration device may receive a sideband configuration signal. The UCIe link configuration device executing a software and/or firmware may receive the sideband configuration signal from the software and/or firmware. The sideband configuration signal may include sideband configuration data (e.g., active sideband data and/or sideband select enable data; aggregate sideband data, sideband aggregate enable data, and/or redundant lane enable data). In some embodiments, the sideband configuration signal may include sideband configuration timer data (e.g., sideband select timer data, sideband aggregate timer data). In some embodiments, the UCIe link configuration device receiving the sideband configuration signal in block 1102 may include a multi-module chiplet (e.g., multi-module chiplet 202a, 202b, 300, 700 in FIGS. 2, 3, and 7), a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

In block 1104, the UCIe link configuration device may identify that the UCIe link is in an active state (e.g., active state 1002 in FIG. 10). Identifying that the UCIe link is in an active state may be implemented via various methods, such as reading and interpreting a value of a state register for the UCIe link, a power level indicator for the UCIe link, etc. In some embodiments, the UCIe link configuration device identifying that the UCIe link is in an active state in block 1104 may include the multi-module chiplet, the UCIe communications module, the multi-module physical layer logic, and/or the physical layer logic.

In optional block 1106, the UCIe link configuration device may identify that sideband aggregation is supported. The UCIe link configuration device may check with a partner UCIe link configuration device to identify that sideband aggregation is supported by the partner UCIe link configuration device. In other words, UCIe link configuration device may identify that another multi-module chiplet supports a UCIe link using at least two sidebands. Prior to attempting to configure a UCIe link having two or more active sidebands with the partner UCIe link configuration device, the UCIe link configuration device may exchange sideband message commands configured to check that sideband aggregation is supported. In some embodiments, the UCIe link configuration device identifying that sideband aggregation is supported in optional block 1106 may include the multi-module chiplet, the UCIe communications module, the multi-module physical layer logic, and/or the physical layer logic.

In block 1108, the UCIe link configuration device may update a sideband configuration information structure (e.g., sideband select information structure 400 in FIG. 4, sideband aggregate information structure 800 in FIG. 8). In some embodiments, the sideband configuration information structure may be and/or may be stored at a memory (e.g., memory 120, 158 in FIG. 1), such as a sideband configuration information register (e.g., sideband select register, sideband aggregate register). Updating the sideband configuration information structure may include writing the sideband configuration data to the sideband configuration information structure. In some embodiments, updating the sideband configuration information structure may be further described by the descriptions for the method 1200a with reference to FIG. 12A. In some embodiments, updating the sideband configuration information structure may be further described by the descriptions for the method 1200b with reference to FIG. 12B. In some embodiments, the UCIe link configuration device updating the sideband configuration information structure in block 1108 may include the multi-module chiplet, the UCIe communications module, the multi-module physical layer logic, and/or the physical layer logic.

In block 1112, the UCIe link configuration device may transition the UCIe link to a reset state (e.g., reset state 1006 in FIG. 10). Transitioning the UCIe link to a reset state may be implemented by various methods, such as by setting a state register of the UCIe link, increasing a power level from the low power level, etc. During the UCIe reset state, the UCIe link may be reset. For example, the UCIe link may be reset by clearing data relating to the UCIe link from the UCIe link configuration device and/or interrupting the connection of the UCIe link. Clearing the data relating to the data relating to the UCIe link and/or interrupting the connection of the UCIe link may involve toggling power to at least part of the UCIe link configuration device. The sideband configuration information structure may be persistent, or sticky, such that the sideband configuration information structure may retain the sideband configuration data through the reset state. In some embodiments, the UCIe link configuration device transitioning the UCIe link to the reset state in block 1112 may include the multi-module chiplet, the UCIe communications module, the multi-module physical layer logic, and/or the physical layer logic.

In block 1114, the UCIe link configuration device may initialize the UCIe link including at least one sideband that is a different functional sideband of the multi-module chiplet than a first sideband following the reset state of the UCIe link. The first sideband may be a sideband used for the previously initialized UCIe link. The UCIe link configuration device may initialize the UCIe link using settings of the sideband configuration information structure. Initializing the UCIe link using settings of the sideband configuration information structure may include using sideband configuration data from the sideband configuration information structure to initialize one or more sidebands for the UCIe link. In some embodiments, initializing the UCIe link may be further described by the descriptions for the method 1300a with reference to FIG. 13A. In some embodiments, initializing the UCIe link may be further described by the descriptions for the method 1300b with reference to FIG. 13B. In some embodiments, initializing the UCIe link following the reset state of the UCIe link may include implementing and/or transitioning between a sideband initialize state (e.g., sideband initialize state 1008 in FIG. 10), a mainband initialize state (e.g., mainband initialize state 1010 in FIG. 10), a mainband train state (e.g., mainband train state 1012 in FIG. 10), a UCIe link initialize state (e.g., UCIe link initialize state 1014 in FIG. 10) and/or the active state of the UCIe link. In some embodiments, the initializing the UCIe link including the at least one sideband that is a different functional sideband of the multi-module chiplet than the first sideband following the reset state of the UCIe link in block 1114 may include the multi-module chiplet, the UCIe communications module, the multi-module physical layer logic, and/or the physical layer logic.

With reference to FIG. 11B, in the method 1100b, in block 1102, the UCIe link configuration device may receive the sideband configuration signal. In some embodiments, the UCIe link configuration device receiving the sideband configuration signal in block 1102 may include a multi-module chiplet (e.g., multi-module chiplet 202a, 202b, 300, 700 in FIGS. 2, 3, and 7), a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

In block 1104, the UCIe link configuration device may identify that the UCIe link is in an active state (e.g., active state 1002 in FIG. 10). In some embodiments, the UCIe link configuration device identifying that the UCIe link is in an active state in block 1104 may include the multi-module chiplet, the UCIe communications module, the multi-module physical layer logic, and/or the physical layer logic.

In optional block 1106, the UCIe link configuration device may identify that sideband aggregation is supported. In some embodiments, the UCIe link configuration device identifying that sideband aggregation is supported in optional block 1104 may include the multi-module chiplet, the UCIe communications module, the multi-module physical layer logic, and/or the physical layer logic.

In block 1108, the UCIe link configuration device may update the sideband configuration information structure (e.g., sideband select information structure 400 in FIG. 4, sideband aggregate information structure 800 in FIG. 8). In some embodiments, the UCIe link configuration device updating the sideband configuration information structure in block 1108 may include the multi-module chiplet, the UCIe communications module, the multi-module physical layer logic, and/or the physical layer logic.

In determination block 1110, the UCIe link configuration device may determine whether the UCIe link is in a low power state (e.g., low power state 1004 in FIG. 10). Determining whether the UCIe link is in a low power state may be implemented via various methods, such as reading and interpreting a value of a state register for the UCIe link, a power level indicator for the UCIe link, etc. In some embodiments, the UCIe link configuration device determining whether the UCIe link is in a low power state in determination block 1110 may include the multi-module chiplet, the UCIe communications module, the multi-module physical layer logic, and/or the physical layer logic.

In response to determining that the UCIe link is not in a low power state (i.e., determination block 1110="No"), the UCIe link configuration device may determine whether the UCIe link is in a low power state in determination block 1110. In some embodiments, the UCIe link configuration device determining whether the UCIe link is in a low power state in determination block 1110 may include the multi-module chiplet, the UCIe communications module, the multi-module physical layer logic, and/or the physical layer logic.

In response to determining that the UCIe link is in a low power state (i.e., determination block 1110="Yes"), the UCIe link configuration device may transition the UCIe link to the reset state (e.g., reset state 1006 in FIG. 10) in block 1112. In some embodiments, the UCIe link configuration device transitioning the UCIe link to the reset state in block 1112 may include the multi-module chiplet, the UCIe communications module, the multi-module physical layer logic, and/or the physical layer logic.

In block 1114, the UCIe link configuration device may initialize the UCIe link including at least one sideband that is a different functional sideband of the multi-module chiplet than a first sideband following the reset state of the UCIe link. In some embodiments, the UCIe link configuration device initializing the UCIe link including the at least one sideband that is a different functional sideband of the multi-module chiplet than the first sideband following the reset state of the UCIe link in block 1114 may include the multi-module chiplet, the UCIe communications module, the multi-module physical layer logic, and/or the physical layer logic.

With reference to FIG. 11C, in the method 1100c, in block 1102, the UCIe link configuration device may receive the sideband configuration signal. In some embodiments, the UCIe link configuration device receiving the sideband configuration signal in block 1102 may include a multi-module chiplet (e.g., multi-module chiplet 202a, 202b, 300, 700 in FIGS. 2, 3, and 7), a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

In block 1104, the UCIe link configuration device may identify that the UCIe link is in an active state (e.g., active state 1002 in FIG. 10). In some embodiments, the UCIe link configuration device identifying that the UCIe link is in an active state in block 1104 may include the multi-module chiplet, the UCIe communications module, the multi-module physical layer logic, and/or the physical layer logic.

In optional block 1106, the UCIe link configuration device may identify that sideband aggregation is supported. In some embodiments, the UCIe link configuration device identifying that sideband aggregation is supported in optional block 1104 may include the multi-module chiplet, the UCIe communications module, the multi-module physical layer logic, and/or the physical layer logic.

In block 1108, the UCIe link configuration device may update the sideband configuration information structure (e.g., sideband select information structure 400 in FIG. 4, sideband aggregate information structure 800 in FIG. 8). In some embodiments, the UCIe link configuration device updating the sideband configuration information structure in block 1108 may include the multi-module chiplet, the UCIe communications module, the multi-module physical layer logic, and/or the physical layer logic.

In block 1116, the UCIe link configuration device may update a sideband configuration timer information structure (e.g., sideband select timer information structure 600 in FIG. 6, sideband aggregate timer information structure 900 in FIG. 9). The sideband configuration signal may include sideband configuration timer data (e.g., sideband select timer data, sideband aggregate timer data), which may represent a designated period for ensuring the UCIe link transitions from the active state to a low power state (e.g., low power state 1004 in FIG. 10). The UCIe link configuration device may write the sideband configuration timer data to the sideband configuration timer information structure, setting a value at the sideband configuration timer information structure to use as the period. Updating the sideband configuration timer information structure may prompt timing of the period to commence by, for example, decrementing the sideband configuration timer data at the sideband configuration timer information structure periodically and/or episodically. In some embodiments, the UCIe link configuration device updating the sideband configuration timer information structure in block 1116 may include the multi-module chiplet, the UCIe communications module, the multi-module physical layer logic, and/or the physical layer logic.

In determination block 1110, the UCIe link configuration device may determine whether the UCIe link is in a low power state. In some embodiments, the UCIe link configuration device determining whether the UCIe link is in a low power state in determination block 1110 may include the multi-module chiplet, the UCIe communications module, the multi-module physical layer logic, and/or the physical layer logic.

In response to determining that the UCIe link is not in a low power state (i.e., determination block 1110="No"), the UCIe link configuration device may determine whether the sideband configuration timer data has expired in determination block 1118. For example, as timing of the period continues by, for example, decrementing the sideband configuration timer data at the sideband configuration timer information structure, the sideband configuration timer data may change. The UCIe link configuration device may compare a value of the sideband configuration timer data at the sideband configuration timer information structure to a threshold sideband configuration timer value (e.g., threshold sideband select timer value, threshold sideband aggregate timer value). The sideband configuration timer data may expire when achieving and/or exceeding a threshold sideband configuration timer value. In some embodiments, the UCIe link configuration device determining whether the sideband configuration timer data has expired in determination block 1118 may include the multi-module chiplet, the UCIe communications module, the multi-module physical layer logic, and/or the physical layer logic.

In response to determining that the sideband configuration timer data has not expired (i.e., determination block 1118="No"), the UCIe link configuration device may determine whether the UCIe link is in a low power state in determination block 1110. In some embodiments, the UCIe link configuration device determining whether the UCIe link is in a low power state in determination block 1110 may include the multi-module chiplet, the UCIe communications module, the multi-module physical layer logic, and/or the physical layer logic.

In response to determining that the sideband configuration timer data has expired (i.e., determination block 1118="Yes"), the UCIe link configuration device may transition the UCIe link to a low power state in block 1120. Transitioning the UCIe link to a low power state may be implemented by various methods, such as by setting a state register of the UCIe link, decreasing a power level from an active level, etc. In some embodiments, the UCIe link configuration device transitioning the UCIe link to the low power state in block 1120 may include the multi-module chiplet, the UCIe communications module, the multi-module physical layer logic, and/or the physical layer logic.

In response to determining that the UCIe link is in a low power state (i.e., determination block 1110="Yes"); or following transitioning the UCIe link to the low power state in block 1120, the UCIe link configuration device may transition the UCIe link to the reset state in block 1112. In some embodiments, the UCIe link configuration device transitioning the UCIe link to the reset state in block 1112 may include the multi-module chiplet, the UCIe communications module, the multi-module physical layer logic, and/or the physical layer logic.

In block 1114, the UCIe link configuration device may initialize the UCIe link including at least one sideband that is a different functional sideband of the multi-module chiplet than a first sideband following the reset state of the UCIe link. In some embodiments, the UCIe link configuration device initializing the UCIe link including the at least one sideband that is a different functional sideband of the multi-module chiplet than the first sideband following the reset state of the UCIe link in block 1114 may include the multi-module chiplet, the UCIe communications module, the multi-module physical layer logic, and/or the physical layer logic.

Figure 12A:
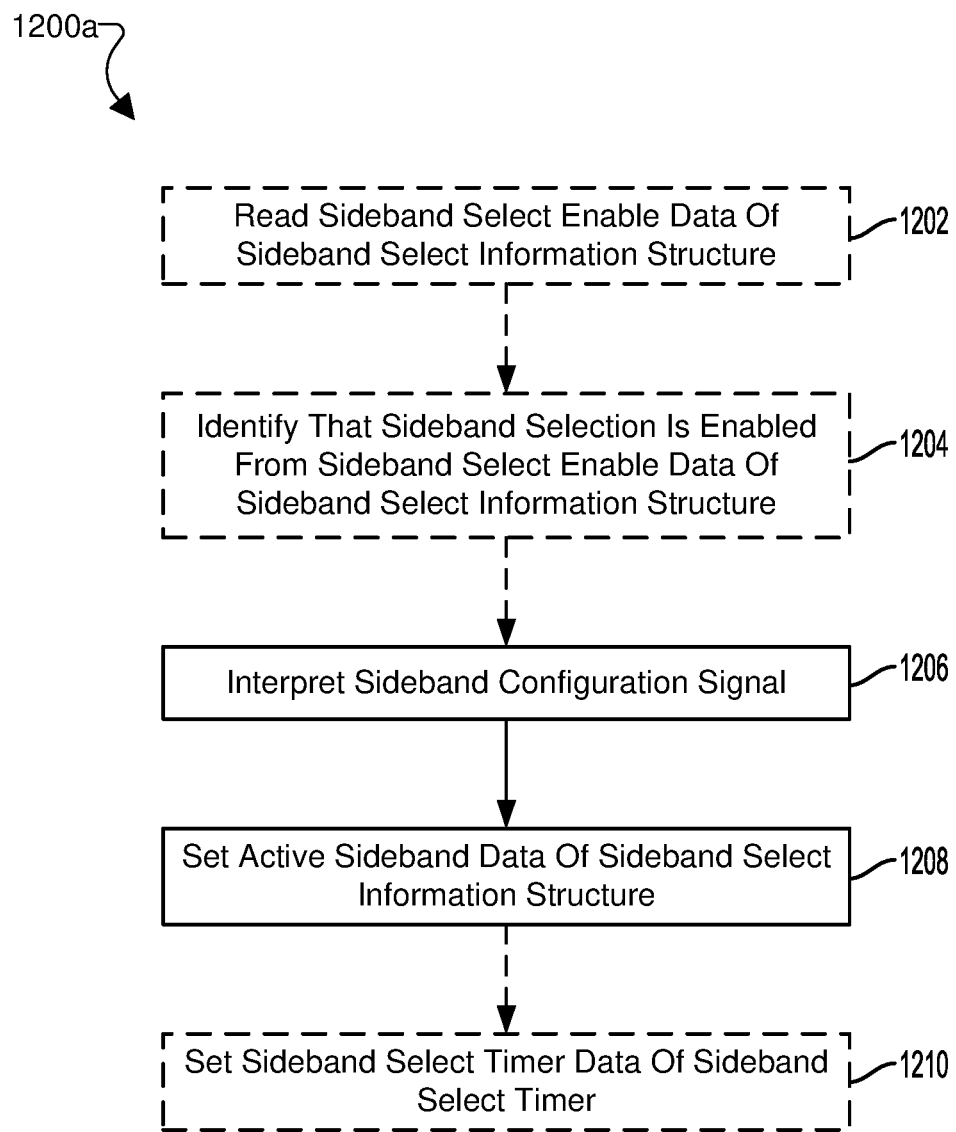
FIGS. 12A and 12B are process flow diagrams illustrating example methods for implementing multi-module chiplet configured UCIe link sideband configuration according to an embodiment.
Figure 12B:
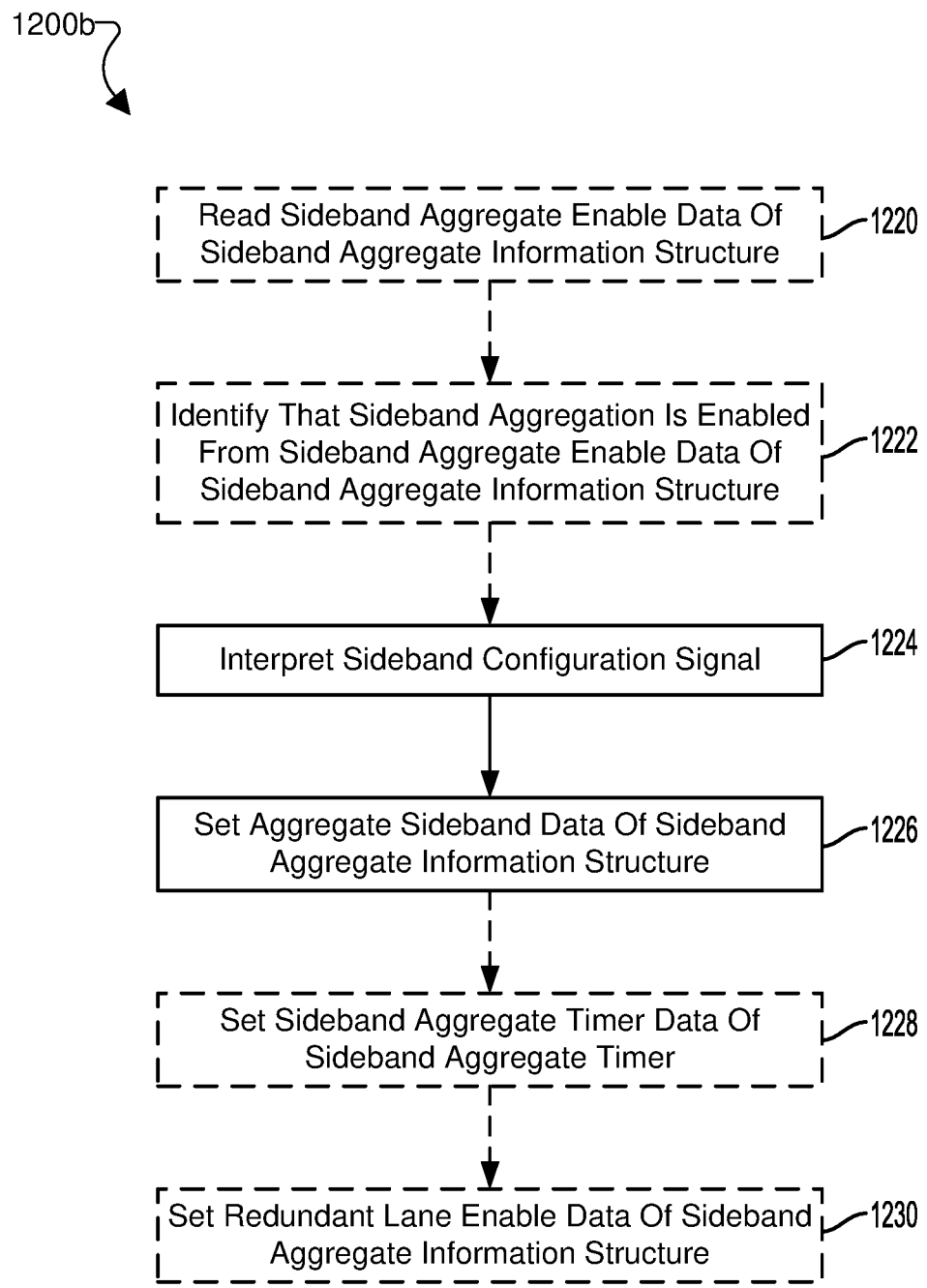

FIGS. 12A and 12B illustrate example methods 1200a, 1200b for implementing multi-module chiplet configured UCIe link sideband configuration according to various embodiments. With reference to FIGS. 1-12B, the methods 1200a, 1200b may be implemented in a computing device (e.g., computing device 100, SoC 102, 104 in FIGS. 1 and 2, UCIe system 200 in FIG. 2), in hardware (e.g., UCIe communications module 204a, 204b in FIG. 2, multi-module physical layer logic 304, physical layer logic 306a, 306b, 306c, 306d in FIGS. 3 and 7), in software (e.g., UCIe communications module 204a, 204b in FIG. 2, multi-module physical layer logic 304, physical layer logic 306a, 306b, 306c, 306d in FIGS. 3 and 7) executing in a processor (e.g., multi-module chiplet 202a, 202b, 300, 700 in FIGS. 2, 3, and 7), or in a combination of a software-configured processor and dedicated hardware (e.g., multi-module chiplet 202a, 202b, 300, 700 in FIGS. 2, 3, and 7), that includes other individual components, such as various memories/caches (e.g., sideband select information structure 400 in FIG. 4, sideband select timer information structure 600 in FIG. 6, sideband aggregate information structure 800 in FIG. 8, sideband aggregate timer information structure 900 in FIG. 9) and various memory/cache controllers. In order to encompass the alternative configurations enabled in various embodiments, the hardware implementing the methods 1200a, 1200b is referred to herein as a "UCIe link configuration device."

With reference to FIG. 12A, for the method 1200a, in optional block 1202, the UCIe link configuration device may read a sideband select enable data from a sideband select information structure (e.g., sideband select information structure 400 in FIG. 4). In some embodiments, the sideband select information structure may be and/or may be stored at a memory (e.g., memory 120, 158 in FIG. 1), such as a sideband select register. The sideband select enable data may be configured with different values that may represent whether the UCIe link configuration device may implement UCIe link sideband selection. In some embodiments, the UCIe link configuration device reading the sideband select enable data from the sideband select information structure in optional block 1202 may include a multi-module chiplet (e.g., multi-module chiplet 202a, 202b, 300, 700 in FIGS. 2, 3, and 7), a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

In optional block 1204, the UCIe link configuration device may identify that UCIe link sideband selection is enabled from the sideband select enable data of the sideband select information structure. The value of the sideband select enable data may be configured to represent that the UCIe link configuration device may implement UCIe link sideband selection, and the UCIe link configuration device may interpret the value of the sideband select enable data to identify that UCIe link sideband selection is enabled. In some embodiments, the UCIe link configuration device identifying that UCIe link sideband selection is enabled from the sideband select enable data of the sideband select information structure in optional block 1204 may include the multi-module chiplet, the UCIe communications module, the multi-module physical layer logic, and/or the physical layer logic.

In block 1206, the UCIe link configuration device may interpret a sideband configuration signal. The sideband configuration signal may be the sideband configuration signal received in block 1102 of the methods 1100a, 1100b, described with reference to FIGS. 11A, 11B. The sideband configuration signal may include sideband configuration data (e.g., active sideband data and/or sideband select enable data). In some embodiments, the sideband configuration signal may include sideband configuration timer data (e.g., sideband select timer data). In some embodiments, the UCIe link configuration device interpreting the sideband configuration signal in block 1206 may include the multi-module chiplet, the UCIe communications module, the multi-module physical layer logic, and/or the physical layer logic.

In block 1208, the UCIe link configuration device may set active sideband data of the sideband select information structure. The UCIe link configuration device may write the active sideband data received in the sideband configuration signal to the sideband select information structure. The active sideband data may be configured with values to represent which functional sideband is the active, or enabled, sideband. In some embodiments, the UCIe link configuration device setting the active sideband data of the sideband select information structure in block 1208 may include the multi-module chiplet, the UCIe communications module, the multi-module physical layer logic, and/or the physical layer logic.

In optional block 1210, the UCIe link configuration device may set sideband select timer data of a sideband select timer information structure (e.g., sideband select timer information structure 600 in FIG. 6). In some embodiments, the sideband select timer information structure may be and/or may be stored at a memory (e.g., memory 120, 158 in FIG. 1), such as a sideband select timer. The UCIe link configuration device may write the sideband select timer data received in the sideband configuration signal to the sideband select timer information structure. The sideband select timer data may be configured with a value representing a designated period for triggering implementation of a UCIe link transition from an active state (e.g., active state 1002 in FIG. 10) to a low power state (e.g., low power state 1004 in FIG. 10). In some embodiments, the UCIe link configuration device setting the sideband select timer data of the sideband select timer information structure in optional block 1210 may include the multi-module chiplet, the UCIe communications module, the multi-module physical layer logic, and/or the physical layer logic.

With reference to FIG. 12B, for the method 1200*b*, in optional block 1220, the UCIe link configuration device may read a sideband aggregate enable data from a sideband aggregate information structure (e.g., sideband aggregate information structure 800 in FIG. 8). In some embodiments, the sideband aggregate information structure may be and/or may be stored at a memory (e.g., memory 120, 158 in FIG. 1), such as a sideband aggregate register. The sideband aggregate enable data may be configured with different values that may represent whether the UCIe link configuration device may implement UCIe link sideband aggregation. In some embodiments, the UCIe link configuration device reading the sideband aggregate enable data from the sideband aggregate information structure in optional block 1202 may include a multi-module chiplet (e.g., multi-module chiplet 202*a*, 202*b*, 300, 700 in FIGS. 2, 3, and 7), a UCIe communications module (e.g., UCIe communications module 204*a*, 204*b* in FIG. 2), a multi-module physical layer logic (e.g., multi-module physical layer logic 304 in FIGS. 3 and 7), and/or a physical layer logic (e.g., physical layer logic 306*a*, 306*b*, 306*c*, 306*d* in FIGS. 3 and 7).

In optional block 1222, the UCIe link configuration device may identify that UCIe link sideband aggregation is enabled from the sideband aggregate enable data of the sideband aggregate information structure. The value of the sideband aggregate enable data may be configured to represent that the UCIe link configuration device may implement UCIe link sideband aggregation, and the UCIe link configuration device may interpret the value of the sideband aggregate enable data to identify that UCIe link sideband aggregation is enabled. In some embodiments, the UCIe link configuration device identifying that UCIe link sideband aggregation is enabled from the sideband aggregate enable data of the sideband aggregate information structure in optional block 1222 may include the multi-module chiplet, the UCIe communications module, the multi-module physical layer logic, and/or the physical layer logic.

In block 1224, the UCIe link configuration device may interpret a sideband configuration signal. The sideband configuration signal may be the sideband configuration signal received in block 1102 of the methods 1100*a*, 1100*b*, described with reference to FIGS. 11A, 11B. The sideband configuration signal may include sideband configuration data (e.g., aggregate sideband data, sideband aggregate enable data, and/or redundant lane enable data). In some embodiments, the sideband configuration signal may include sideband configuration timer data (e.g., sideband aggregate timer data). In some embodiments, the UCIe link configuration device interpreting the sideband configuration signal in block 1224 may include the multi-module chiplet, the UCIe communications module, the multi-module physical layer logic, and/or the physical layer logic.

In block 1226, the UCIe link configuration device may set aggregate sideband data of the sideband aggregate information structure. The UCIe link configuration device may write the aggregate sideband data received in the sideband configuration signal to the sideband aggregate information structure. The aggregate sideband data may be configured with values to represent which two or more sidebands are active, or enabled, and/or are functional. In some embodiments, the UCIe link configuration device setting the aggregate sideband data of the sideband aggregate information structure in block 1226 may include the multi-module chiplet, the UCIe communications module, the multi-module physical layer logic, and/or the physical layer logic.

In optional block 1228, the UCIe link configuration device may set sideband aggregate timer data of a sideband aggregate timer information structure (e.g., sideband aggregate timer information structure 600 in FIG. 6). In some embodiments, the sideband aggregate timer information structure may be and/or may be stored at a memory (e.g., memory 120, 158 in FIG. 1), such as a sideband aggregate timer. The UCIe link configuration device may write the sideband aggregate timer data received in the sideband configuration signal to the sideband aggregate timer information structure. The sideband aggregate timer data may be configured with a value representing a designated period for triggering implementation of a UCIe link transition from an active state (e.g., active state 1002 in FIG. 10) to a low power state (e.g., low power state 1004 in FIG. 10). In some embodiments, the UCIe link configuration device setting the sideband aggregate timer data of the sideband aggregate timer information structure in optional block 1228 may include the multi-module chiplet, the UCIe communications module, the multi-module physical layer logic, and/or the physical layer logic.

In optional block 1230, the UCIe link configuration device may set redundant lane enable data of the sideband aggregate information structure. The UCIe link configuration device may write the redundant lane enable data received in the sideband configuration signal to the sideband aggregate information structure. The redundant lane enable data may be configured with different values to represent whether redundant lanes may be implemented for a UCIe link. In some embodiments, the UCIe link configuration device setting the redundant lane enable data of the sideband aggregate information structure in optional block 1230 may include the multi-module chiplet, the UCIe communications module, the multi-module physical layer logic, and/or the physical layer logic.

Figure 13A:
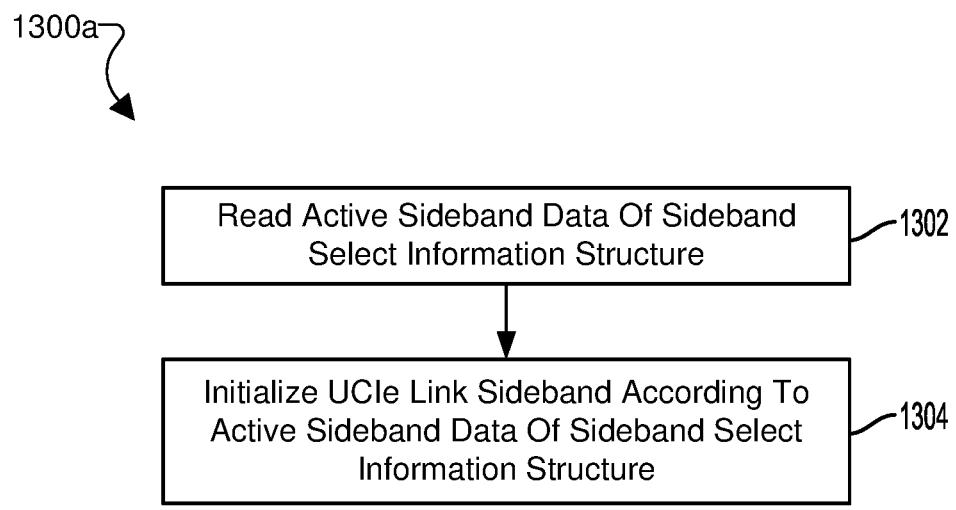
FIGS. 13A and 13B are process flow diagrams illustrating example methods for implementing multi-module chiplet configured UCIe link sideband configuration according to an embodiment.
Figure 13B:
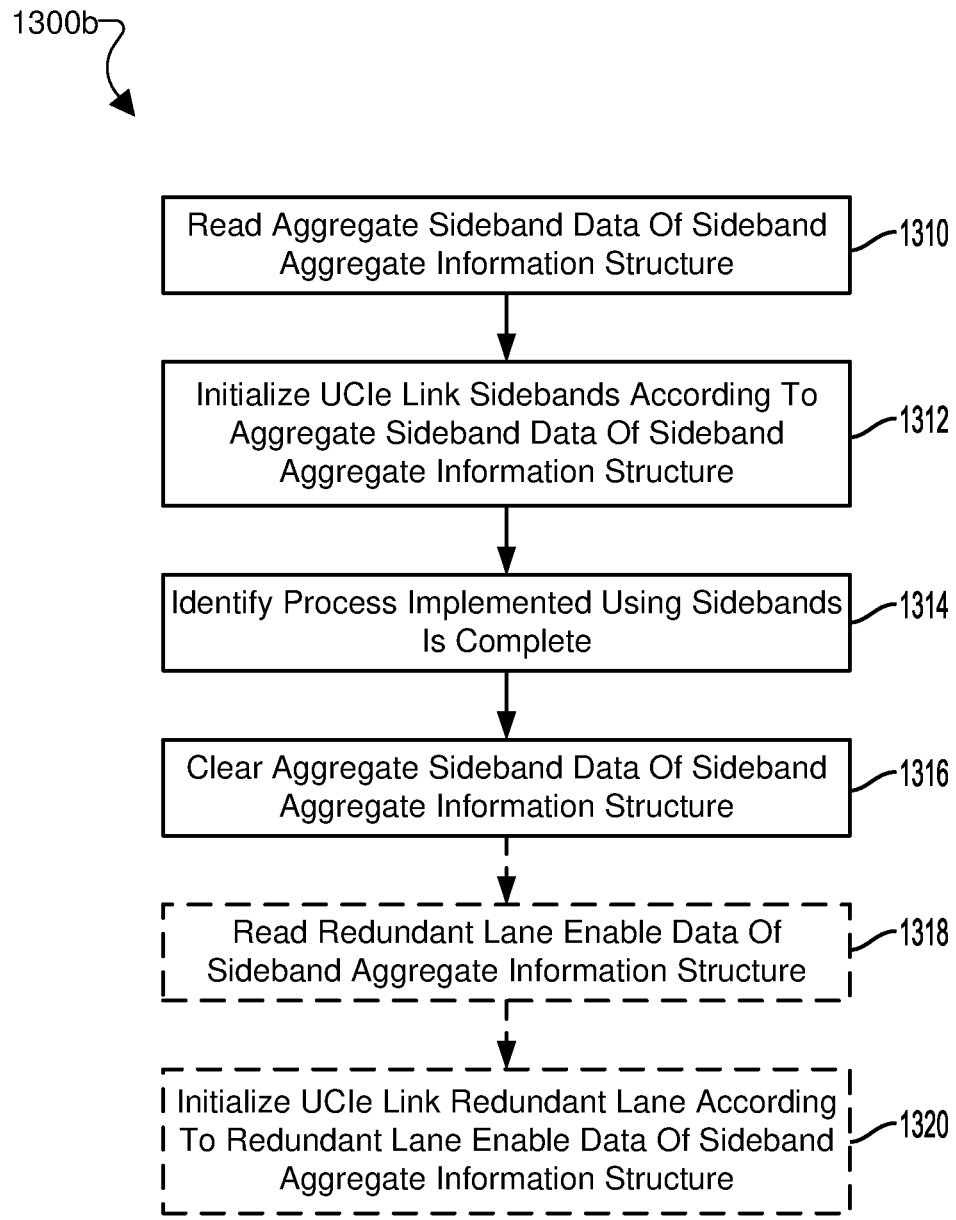

FIGS. 13A and 13B illustrate example methods 1300a, 1300b for implementing multi-module chiplet configured UCIe link sideband configuration according to various embodiments. With reference to FIGS. 1-13B, the methods 1300a, 1300b may be implemented in a computing device (e.g., computing device 100, SoC 102, 104 in FIGS. 1 and 2, UCIe system 200 in FIG. 2), in hardware (e.g., UCIe communications module 204a, 204b in FIG. 2, multi-module physical layer logic 304, physical layer logic 306a, 306b, 306c, 306d in FIGS. 3 and 7), in software (e.g., UCIe communications module 204a, 204b in FIG. 2, multi-module physical layer logic 304, physical layer logic 306a, 306b, 306c, 306d in FIGS. 3 and 7) executing in a processor (e.g., multi-module chiplet 202a, 202b, 300, 700 in FIGS. 2, 3, and 7), or in a combination of a software-configured processor and dedicated hardware (e.g., multi-module chiplet 202a, 202b, 300, 700 in FIGS. 2, 3, and 7), that includes other individual components, such as various memories/caches (e.g., sideband select information structure 400 in FIG. 4, sideband select timer information structure 600 in FIG. 6, sideband aggregate information structure 800 in FIG. 8, sideband aggregate timer information structure 900 in FIG. 9) and various memory/cache controllers. In order to encompass the alternative configurations enabled in various embodiments, the hardware implementing the methods 1300a, 1300b is referred to herein as a "UCIe link configuration device."

With reference to FIG. 13A, for the method 1300a, in block 1302, the UCIe link configuration device may read active sideband data from a sideband select information structure (e.g., sideband select information structure 400 in FIG. 4). In some embodiments, the sideband select information structure may be and/or may be stored at a memory (e.g., memory 120, 158 in FIG. 1), such as a sideband select register. The active sideband data may be configured with values to represent which functional sideband is the active, or enabled, sideband. In some embodiments, the UCIe link configuration device reading the active sideband data from the sideband select information structure in block 1302 may include a multi-module chiplet (e.g., multi-module chiplet 202a, 202b, 300, 700 in FIGS. 2, 3, and 7), a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

In block 1304, the UCIe link configuration device may initialize a UCIe link sideband according to the active sideband data of the sideband select information structure. The UCIe link configuration device may interpret the active sideband data and identify the functional sideband to activate during a UCIe link training process. For example, based on the identified functional sideband to activate, the UCIe link configuration device may initialize the sideband during a sideband initialize state (e.g., sideband initialize state 1008 in FIG. 10) of the UCIe link training process. In some embodiments, initializing the UCIe link sideband may include providing a greater amount of power to a UCIe sideband component (e.g., sideband module 212a, 212b, 308a, 308b, 308c, 308d in FIGS. 2, 3 and 7, sideband TX module 214a, 214b, sideband RX module 216a, 216b in FIG. 2, physical layer logic 306a, 306b, 306c, 306d in FIGS. 3 and 7) of the UCIe link configuration device associated with the functional sideband to activate than during an inactive state of the functional sideband. In some embodiments, the UCIe link configuration device initializing the UCIe link sideband according to the active sideband data of the sideband select information structure in block 1304 may include the multi-module chiplet, the UCIe communications module, the multi-module physical layer logic, and/or the physical layer logic.

With reference to FIG. 13B, for the method 1300b, in block 1310 the UCIe link configuration device may read aggregate sideband data from a sideband aggregate information structure (e.g., sideband aggregate information structure 800 in FIG. 8). In some embodiments, the sideband aggregate information structure may be and/or may be stored at a memory (e.g., memory 120, 158 in FIG. 1), such as a sideband aggregate register. The aggregate sideband data may be configured with values to represent which two or more sidebands are active, or enabled, and/or are functional. In some embodiments, the UCIe link configuration device reading the aggregate sideband data from the sideband aggregate information structure in block 1310 may include a multi-module chiplet (e.g., multi-module chiplet 202a, 202b, 300, 700 in FIGS. 2, 3, and 7), a UCIe communications module (e.g., UCIe communications module 204a, 204b in FIG. 2), a multi-module physical layer logic (e.g., multi-module physical layer logic 304 in FIGS. 3 and 7), and/or a physical layer logic (e.g., physical layer logic 306a, 306b, 306c, 306d in FIGS. 3 and 7).

In block 1312, the UCIe link configuration device may initialize UCIe link sidebands according to the aggregate sideband data of the sideband aggregate information structure. The UCIe link configuration device may interpret the aggregate sideband data and identify the two or more functional sidebands to activate during a UCIe link training process. For example, based on the two or more identified functional sidebands to activate, the UCIe link configuration device may initialize the sidebands during a sideband initialize state (e.g., sideband initialize state 1008 in FIG. 10) of the UCIe link training process. In some embodiments, initializing the UCIe link sidebands may include providing a greater amount of power to a UCIe sideband component (e.g., sideband module 212a, 212b, 308a, 308b, 308c, 308d in FIGS. 2, 3 and 7, sideband TX module 214a, 214b, sideband RX module 216a, 216b in FIG. 2, physical layer logic 306a, 306b, 306c, 306d in FIGS. 3 and 7) of the UCIe link configuration device associated with each of the functional sidebands to activate than during an inactive state of the functional sidebands. In some embodiments, the UCIe link configuration device initializing the UCIe link sidebands according to the aggregate sideband data of the sideband aggregate information structure in block 1312 may include the multi-module chiplet, the UCIe communications module, the multi-module physical layer logic, and/or the physical layer logic.

In block 1314, the UCIe link configuration device may identify a process implemented using the sidebands is complete. The UCIe link configuration device executing a software and/or firmware may receive a sideband configuration signal from the software and/or firmware, such as described in block 1102 of the methods 1100a, 1112b, with reference to FIGS. 11A, 11B, that may include the aggregate sideband data for implementing a process using the sidebands. The software and/or firmware may issue the sideband configuration signal for the purpose of implementing the process, including, for example, management activities, such as firmware loading, patch downloading, configuration management, SPDM information exchange, etc. The UCIe link configuration device may identify completion of the process using the sidebands. In some embodiments, the UCIe link configuration device identifying the process implemented using the sidebands is complete in block 1314 may include the multi-module chiplet, the UCIe communications module, the multi-module physical layer logic, and/or the physical layer logic.

In block 1316, the UCIe link configuration device may clear the aggregate sideband data from the sideband aggregate information structure. Once the process is complete, there may be no further need to have multiple sidebands remain active. Clearing the aggregate sideband data may enable a default UCIe link sideband configuration, such as a UCIe link sideband configuration having a single active sideband, for a subsequent UCIe link training. Avoiding activation of multiple sidebands for subsequent UCIe link training without a process using the multiple sidebands may avoid consuming power unnecessarily for unused active sidebands. In some embodiments, the UCIe link configuration device clearing the aggregate sideband data from the sideband aggregate information structure in block 1316 may include the multi-module chiplet, the UCIe communications module, the multi-module physical layer logic, and/or the physical layer logic.

In optional block 1318, the UCIe link configuration device may read redundant lane enable data from the sideband aggregate information structure. The redundant lane enable data may be configured with values to represent whether the UCIe link configuration device may implement redundant lanes for the UCIe link. In some embodiments, block 1318 may be optionally implemented by the UCIe link configuration device of an advanced package with redundant lane capabilities. The redundant lane enable data having a value enabling redundant lanes for the UCIe link may enable the UCIe link configuration device to implement redundant lanes for the UCIe link, such as part of a mainband of the UCIe link. In some embodiments, the UCIe link configuration device reading the redundant lane enable data from the sideband aggregate information structure in optional block 1318 may include the multi-module chiplet, the UCIe communications module, the multi-module physical layer logic, and/or the physical layer logic.

In optional block 1320, the UCIe link configuration device may initialize a UCIe link redundant lane according to the redundant lane enable data of the sideband aggregate information structure. The UCIe link configuration device may interpret the redundant lane enable data and identify whether to implement redundant lanes during a UCIe link training process. For example, based on an enabling value of the redundant lane enable data, the UCIe link configuration device may initialize the mainband with redundant lanes during a mainband initialize state (e.g., mainband initialize state 1010 in FIG. 10) of the UCIe link training process. In some embodiments, initializing the UCIe link mainband with redundant lanes may include providing a greater amount of power to a UCIe mainband component (e.g., mainband module 206*a*, 206*b*, 310*a*, 310*b*, 310*c*, 310*d* in FIGS. 2, 3 and 7, mainband TX module 208*a*, 208*b*, mainband RX module 210*a*, 210*b* in FIG. 2, physical layer logic 306*a*, 306*b*, 306*c*, 306*d* in FIGS. 3 and 7) of the UCIe link configuration than during an active state of the functional sidebands. In some embodiments, the UCIe link configuration device initializing the UCIe link redundant lane according to the redundant lane enable data of the sideband aggregate information structure in optional block 1320 may include the multi-module chiplet, the UCIe communications module, the multi-module physical layer logic, and/or the physical layer logic.

Figure 14:
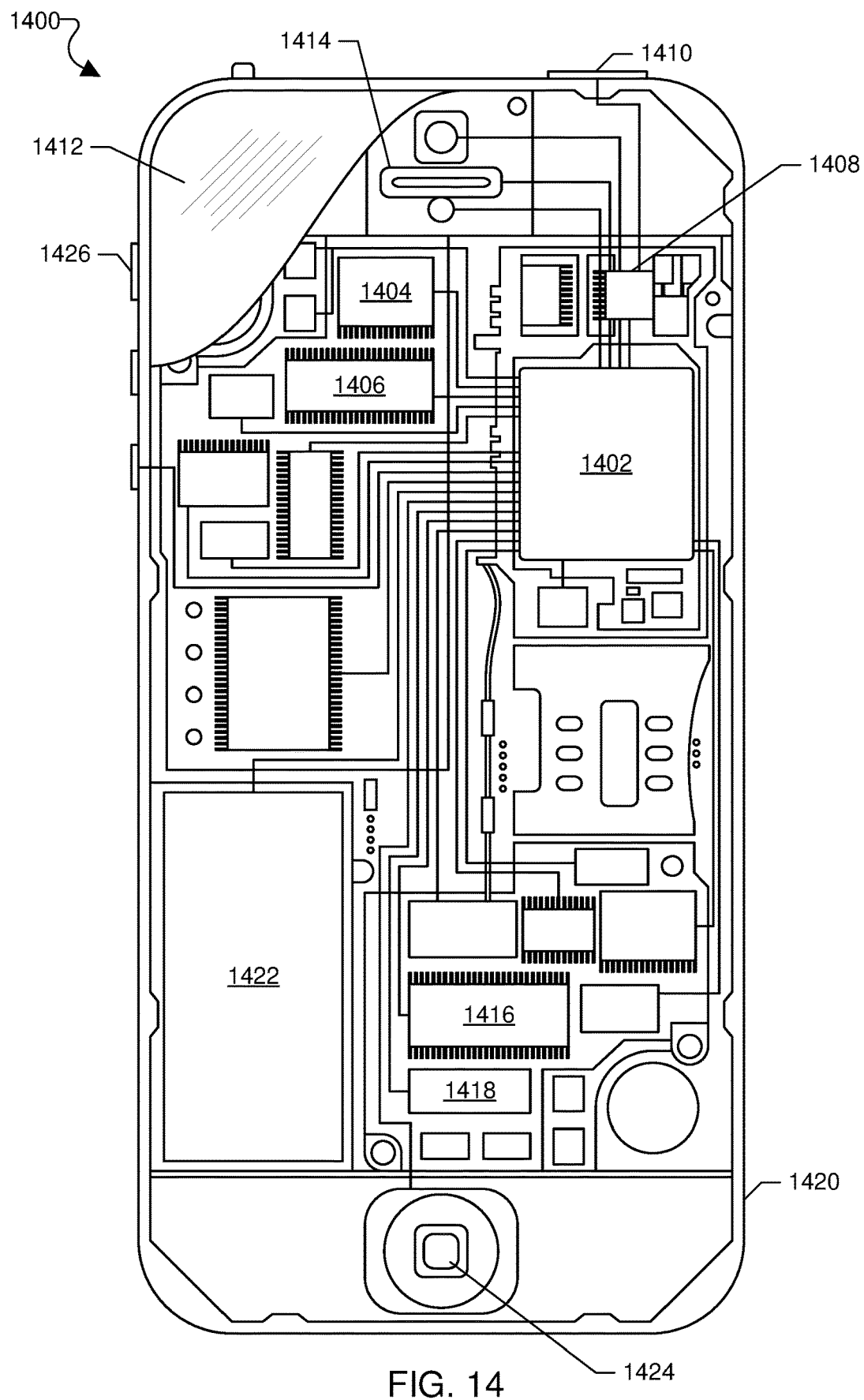
FIG. 14 is a component block diagram illustrating an example mobile computing device suitable for implementing various embodiments.
Figure 15:
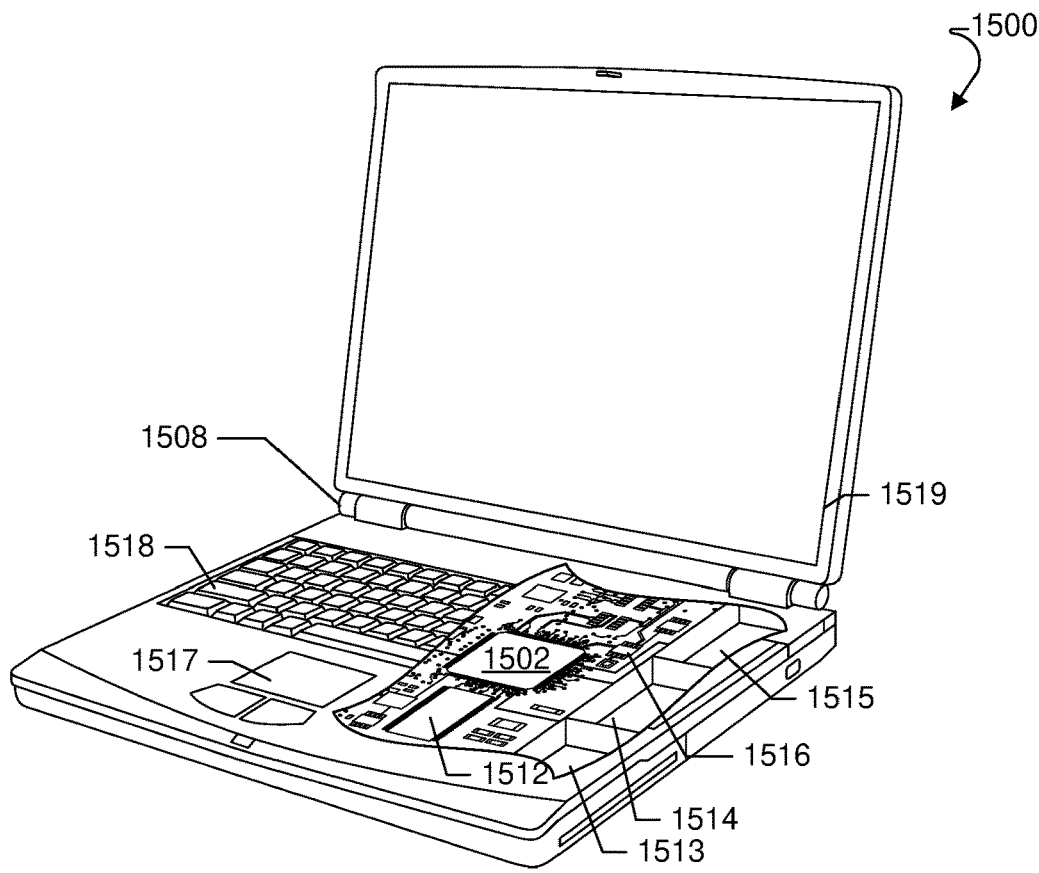
FIG. 15 is a component block diagram illustrating an example mobile computing device suitable for implementing various embodiments.

A system in accordance with the various embodiments (including, but not limited to, embodiments described above with reference to FIGS. 1-13B) may be implemented in a wide variety of computing systems including mobile computing devices, an example of which suitable for use with the various embodiments is illustrated in FIG. 14. The mobile computing device 1400 may include a processor 1402 coupled to a touchscreen controller 1404 and an internal memory 1406. The processor 1402 may be one or more multicore integrated circuits designated for general or specific processing tasks. The internal memory 1406 may be volatile or non-volatile memory, and may also be secure and/or encrypted memory, or unsecure and/or unencrypted memory, or any combination thereof. Examples of memory types that can be leveraged include but are not limited to DDR, Low-Power DDR (LPDDR), Graphics DDR (GDDR), WIDEIO, RAM, Static RAM (SRAM), Dynamic RAM (DRAM), Parameter RAM (P-RAM), Resistive RAM (R-RAM), Magnetoresistive RAM (M-RAM), Spin-Transfer Torque RAM (STT-RAM), and embedded DRAM. The touchscreen controller 1404 and the processor 1402 may also be coupled to a touchscreen panel 1412, such as a resistive-sensing touchscreen, capacitive-sensing touchscreen, infrared sensing touchscreen, etc. Additionally, the display of the mobile computing device 1400 need not have touch screen capability.

The mobile computing device 1400 may have one or more radio signal transceivers 1408 (e.g., Peanut, Bluetooth, ZigBee, Wi-Fi, RF radio) and antennae 1410, for sending and receiving communications, coupled to each other and/or to the processor 1402. The transceivers 1408 and antennae 1410 may be used with the above-mentioned circuitry to implement the various wireless transmission protocol stacks and interfaces. The mobile computing device 1400 may include a cellular network wireless modem chip 1416 that enables communication via a cellular network and is coupled to the processor.

The mobile computing device 1400 may include a peripheral device connection interface 1418 coupled to the processor 1402. The peripheral device connection interface 1418 may be singularly configured to accept one type of connection, or may be configured to accept various types of physical and communication connections, common or proprietary, such as Universal Serial Bus (USB), FireWire, Thunderbolt, or PCIe. The peripheral device connection interface 1418 may also be coupled to a similarly configured peripheral device connection port (not shown).

The mobile computing device 1400 may also include speakers 1414 for providing audio outputs. The mobile computing device 1400 may also include a housing 1420, constructed of a plastic, metal, or a combination of materials, for containing all or some of the components described herein. The mobile computing device 1400 may include a power source 1422 coupled to the processor 1402, such as a disposable or rechargeable battery. The rechargeable battery may also be coupled to the peripheral device connection port to receive a charging current from a source external to the mobile computing device 1400. The mobile computing device 1400 may also include a physical button 1424 for receiving user inputs. The mobile computing device 1400 may also include a power button 1426 for turning the mobile computing device 1400 on and off.

A system in accordance with the various embodiments (including, but not limited to, embodiments described above with reference to FIGS. 1-13B) may be implemented in a wide variety of computing systems that may include a laptop computer 1500, an example of which is illustrated in FIG.

15. Many laptop computers include a touchpad touch surface 1517 that serves as the computer's pointing device, and thus may receive drag, scroll, and flick gestures similar to those implemented on computing devices equipped with a touch screen display and described above. A laptop computer 1500 will typically include a processor 1502 coupled to volatile memory 1512 and a large capacity nonvolatile memory, such as a disk drive 1513 of Flash memory. Additionally, the computer 1500 may have one or more antenna 1508 for sending and receiving electromagnetic radiation that may be connected to a wireless data link and/or cellular telephone transceiver 1516 coupled to the processor 1502. The computer 1500 may also include a floppy disc drive 1514 and a compact disc (CD) drive 1515 coupled to the processor 1502. In a notebook configuration, the computer housing includes the touchpad 1517, the keyboard 1518, and the display 1519 all coupled to the processor 1502. Other configurations of the computing device may include a computer mouse or trackball coupled to the processor (e.g., via a USB input) as are well known, which may also be used in conjunction with the various embodiments.

Figure 16:
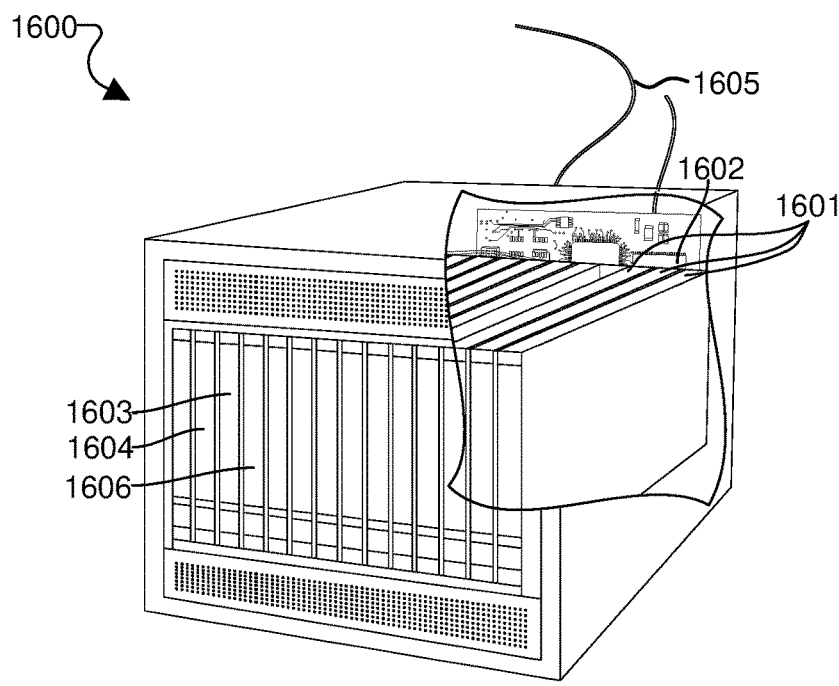
FIG. 16 is a component block diagram illustrating an example server suitable for implementing various embodiments.

A system in accordance with the various embodiments (including, but not limited to, embodiments described above with reference to FIGS. 1-13B) may also be implemented in fixed computing systems, such as any of a variety of commercially available servers. An example server 1600 is illustrated in FIG. 16. Such a server 1600 typically includes one or more multicore processor assemblies 1601 coupled to volatile memory 1602 and a large capacity nonvolatile memory, such as a disk drive 1604. As illustrated in FIG. 16, multicore processor assemblies 1601 may be added to the server 1600 by inserting them into the racks of the assembly. The server 1600 may also include a floppy disc drive, compact disc (CD) or digital versatile disc (DVD) disc drive 1606 coupled to the processor 1601. The server 1600 may also include network access ports 1603 coupled to the multicore processor assemblies 1601 for establishing network interface connections with a network 1605, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Figure 17A:
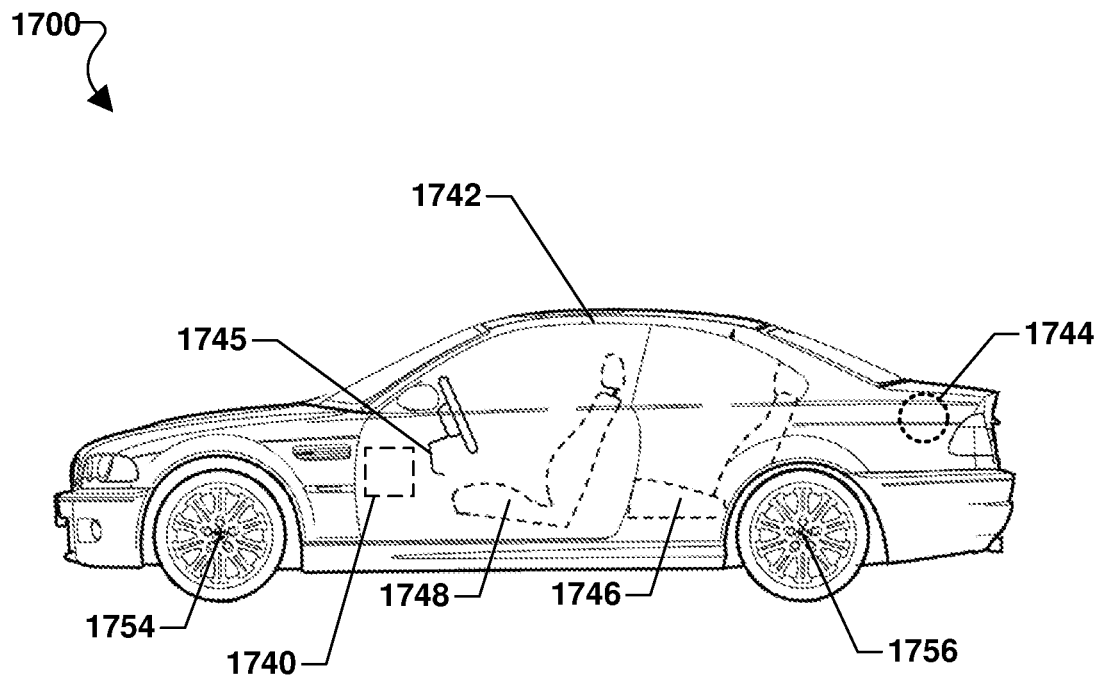
FIGS. 17A-17C are component block diagrams illustrating an example embedded vehicle computing system suitable for implementing various embodiments.
Figure 17B:
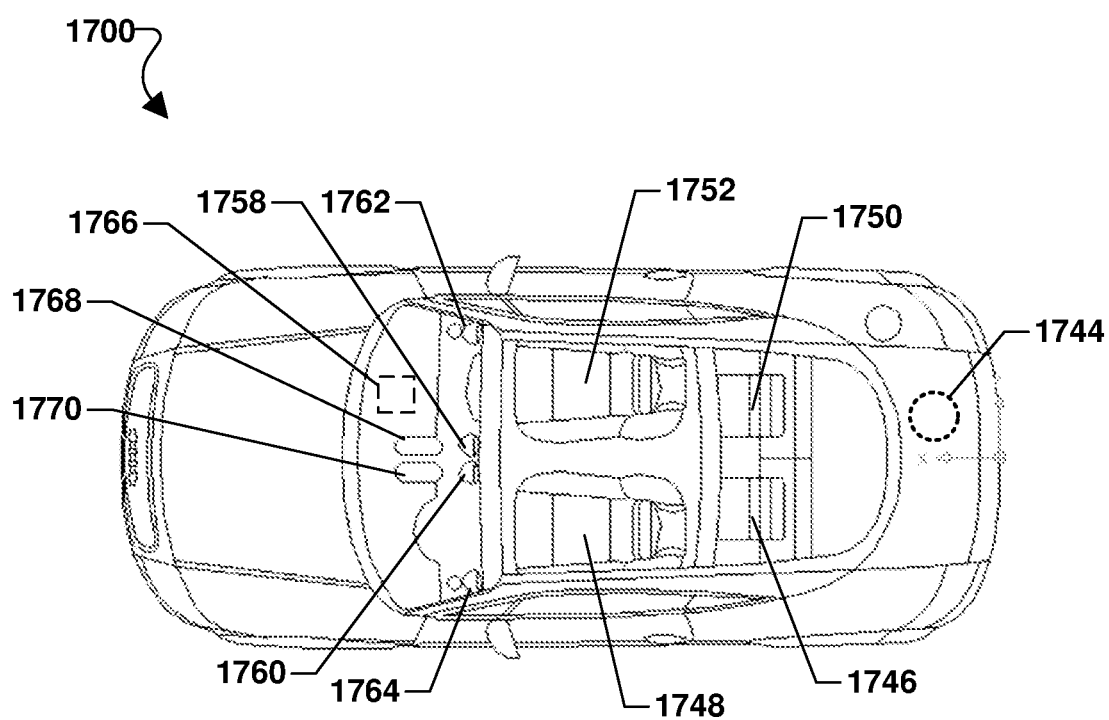
Figure 17C:
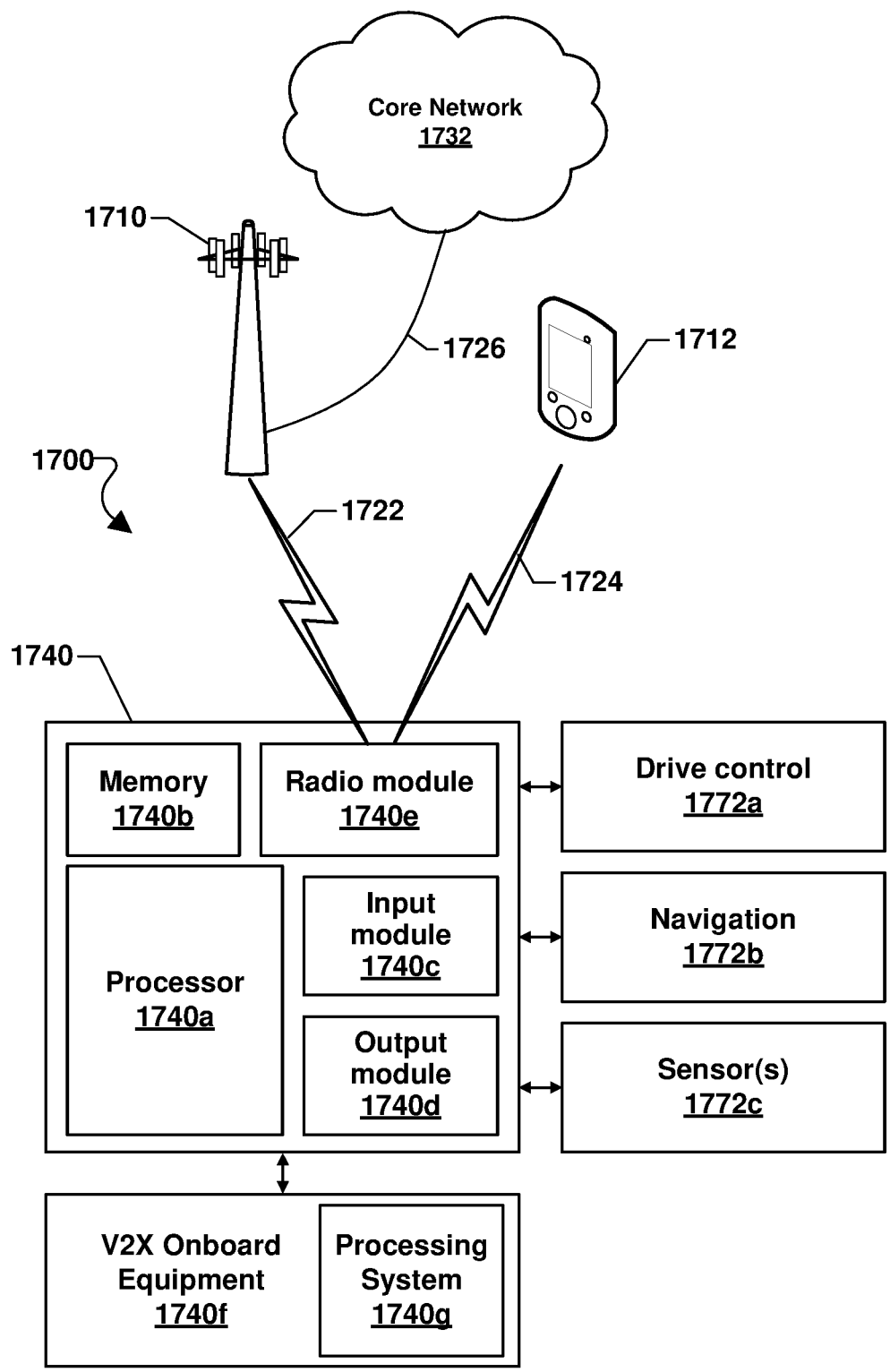

Methods and devices for implementing such methods in accordance with the various embodiments (including, but not limited to, embodiments described above with reference to FIGS. 1-13B) may be implemented in a wide variety of computing systems including an embedded vehicle computing system 1700 an example of which is illustrated in FIGS. 17A-17C. An embedded vehicle computing system 1700 may include a vehicle control unit 1740, such as an ECU, which may include a processor, such as a CPU, an artificial intelligence (AI) processor, etc. The embedded vehicle computing system 1700 may include a plurality of sensors 1742-1770, including global navigation satellite system (GNSS) receivers 1742, accelerometers 1744, occupancy sensors 1746, 1748, 1750, 1752, tire pressure sensors 1754, 1756, cameras 1758, 1760, microphones 1762, 1764, impact sensors 1766, external sensors 1768, 1770.

The plurality of sensors 1742-1770, disposed in or on the vehicle, may be used for various purposes, such as navigation, crash avoidance, etc., as well to provide sensor data regarding objects and people in or on the vehicle. The sensors 1742-1770 may include one or more of a wide variety of sensors capable of detecting a variety of information useful for navigation and collision avoidance. Each of the sensors 1742-1770 may be in wired or wireless communication with a control unit 1740, as well as with each other. In particular, the sensors may include one or more cameras 1758, 1760 or other optical sensors or photo optic sensors. The sensors may further include other types of object detection and ranging sensors, such as external sensors 1768, 1770, IR sensors, and ultrasonic sensors. The sensors may further include tire pressure sensors 1754, 1756, humidity sensors, temperature sensors, satellite GNSS receivers 1742, control input sensors 1745, accelerometers 1744, vibration sensors, gyroscopes, gravimeters, impact sensors 1766, force meters, stress meters, strain sensors, fluid sensors, chemical sensors, gas content analyzers, pH sensors, radiation sensors, Geiger counters, neutron detectors, biological material sensors, microphones 1762, 1764, occupancy sensors 1746, 1748, 1750, 1752, proximity sensors, and other sensors.

The vehicle control unit 1740 may include one or more processors configured with processor-executable instructions to perform navigation and collision avoidance operations using information received from various sensors, particularly the cameras 1758, 1760. In some embodiments, the control unit 1740 may supplement the processing of camera images using distance and relative position (e.g., relative bearing angle) that may be obtained from external sensors 1768, 1770. The control unit 1740 may further be configured to control steering, breaking and speed of the vehicle using information regarding other vehicles determined using various embodiments. The vehicle control unit 1740 may include one or more processors configured with processor-executable instructions to receive information from the sensors 1742-1770 and to perform operations using such information as further described herein. In various embodiments, the vehicle control unit 1740 may include, be a component of, or communicate with V2X onboard equipment of the vehicle.

FIG. 17C is a component block diagram illustrating the embedded vehicle computing system 1700 including components and support systems suitable for implementing various embodiments. The embedded vehicle computing system 1700 may include the control unit 1740, which may include various circuits and devices used to control the operation of the vehicle. The control unit 1740 may include a processor 1740*a*, such as a CPU, an AI processor, etc., a memory 1740*b*, an input module 1740*c*, an output module 1740*d*, and a radio module 1740*e*. The control unit 1740 may be coupled to and configured to control drive control components 1772*a*, navigation components 1772*b*, and one or more sensors 1772*c* of the embedded vehicle computing system 1700. The control unit 1740 may communicate with V2X onboard equipment 1740*f*. The processor 1740*a* may be configured with processor-executable instructions to control maneuvering, navigation, and/or other operations of the vehicle, including operations of various embodiments, including gathering and analyzing real-world vehicle run data gathered from the sensors 1772*c*. The processor 1740*a* may be coupled to the memory 1740*b*. The V2X onboard equipment 1740*f* may include one or more processors 1740*g* configured with processor-executable instructions to perform various operations of various embodiments, including communicating real-world vehicle run data gathered from the sensors 1772*c* between the embedded vehicle computing system 1740 and a wireless communication device 1712 and/or the computing device on a communication network (e.g., a core network 1732) via the radio module 1740*e*.

The radio module 1740*e* may be configured for wireless communication. The radio module 1740*e* may exchange signals (e.g., command signals for controlling maneuvering, signals from navigation facilities, data signals, etc.) via a communication link 1722 with a network transceiver (e.g., the base station 1710), and may provide the signals to the processor 1740*a*, 1740*g* and/or the navigation unit 1772*b*. In some embodiments, the radio module 1740*e* may enable the embedded vehicle computing system 1700 to communicate with a wireless communication device 1712 through the wireless communication link 1724. The wireless communication link 1724 may be a bidirectional or unidirectional communication link, and may use one or more communication protocols.

The input module 1740*c* may receive sensor data from one or more vehicle sensors 1772*c* as well as electronic signals from other components, including the drive control components 1772*a* and the navigation components 1772*b*. The output module 1740*d* may communicate with or activate various components of the embedded vehicle computing system 1700, including the drive control components 1772*a*, the navigation components 1772*b*, and the sensor(s) 1772*c*.

The control unit 1740 may be coupled to the drive control components 1772*a* to control physical elements of the vehicle related to maneuvering and navigation of the vehicle, such as the engine, motors, throttles, steering elements, flight control elements, braking or deceleration elements, and the like. The drive control components 1772*a* may also include components that control other devices of the vehicle, including interior environment controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 1740 may be coupled to the navigation components 1772*b*, and may receive data from the navigation components 1772*b* and be configured to use such data to determine the present position and orientation of the vehicle, as well as an appropriate course toward a destination. The navigation components 1772*b* may include or be coupled to a GNSS receiver system (e.g., one or more Global Positioning System (GPS) receivers) enabling the embedded vehicle computing system 1700 to determine its current position using GNSS signals. Alternatively, or in addition, the navigation components 1772*b* may include radio navigation receivers for receiving navigation beacons or other signals from radio nodes, such as Wi-Fi access points, cellular network sites, radio station, remote computing devices, other vehicles, etc. Through control of the drive control elements 1772*a*, the processor 1740*a* may control the vehicle to navigate and maneuver. The processor 1740*a*, 1740*g* and/or the navigation components 1772*b* may be configured to communicate with a network element such as a server in a communication network (e.g., a core network 1732) via the wireless communication link 1722, 1726 to receive commands to control maneuvering, receive data useful in navigation, provide real-time position reports, etc.

The control unit 1740 may be coupled to one or more sensors 1772*c*. The sensor(s) 1772*c* may include the sensors 1742-1770 as described, and may be configured to provide a variety of data to the processor 1740*a*, 1740*g*.

While the control unit 1740 is described as including separate components, in some embodiments some or all of the components (e.g., the processor 1740*a*, the memory 1740*b*, the input module 1740*c*, the output module 1740*d*, and the radio module 1740*e*) may be integrated in a single device or module, such as an SoC processing device. Such an SoC processing device may be configured for use in vehicles and be configured, such as with processor-executable instructions executing in the processor 1740*a*, to perform operations of navigation and collision avoidance.

Implementation examples are described in the following paragraphs. While some of the following implementation examples are described in terms of example systems, devices, or methods, further example implementations may include: the example systems or devices discussed in the following paragraphs implemented as a method executing operations of the example systems or devices; the example systems, devices, or methods discussed in the following paragraphs implemented by a computing device including a multi-module chiplet, and a UCIe link configuration device configured to perform operations of the example systems, devices, or methods; the example systems, devices, or methods discussed in the following paragraphs implemented by a UCIe link configuration device configured to perform operations of the example systems, devices, or methods; the example systems, devices, or methods discussed in the following paragraphs implemented by a multi-module chiplet including means for performing functions of the example systems, devices, or methods; and the example systems, devices, or methods discussed in the following paragraphs implemented as a non-transitory processor-readable storage medium having stored thereon processor-executable instructions configured to cause a processor of a UCIe link configuration device to perform the operations of the example systems, devices, or methods.

Example 1. A method for Universal Chiplet Interconnect Express (UCIe) link configuration for multi-module chiplets of a computing device, including: transitioning a UCIe link in an active state having a first sideband that is active to the UCIe link in a reset state; and initializing at least one sideband for the UCIe link that is a different functional sideband of a multi-module chiplet than the first sideband following the reset state of the UCIe link.

Example 2. The method of example 1, further including reading active sideband data configured to represent a functional sideband of the multi-module chiplet from a sideband select information structure, in which initializing the at least one sideband for the UCIe link that is a different functional sideband of the multi-module chiplet than the first sideband following the reset state of the UCIe link includes initializing the functional sideband represented by the active sideband data.

Example 3. The method of either of examples 1 or 2, further including: receiving a sideband configuration signal having active sideband data configured to represent a functional sideband of the multi-module chiplet, in which the functional sideband includes the at least one sideband for the UCIe link that is a different functional sideband of the multi-module chiplet than the first sideband; and setting a value at a sideband select information structure based on the active sideband data.

Example 4. The method of any of examples 1-3, further including reading aggregate sideband data configured to represent at least two functional sidebands of the multi-module chiplet from a sideband aggregate information structure, in which initializing the at least one sideband for the UCIe link that is a different functional sideband of the multi-module chiplet than the first sideband following the reset state of the UCIe link includes initializing at least one functional sideband of the at least two functional sidebands represented by the aggregate sideband data.

Example 5. The method of example 4, in which the at least two functional sidebands represented by the aggregate sideband data include the first sideband and the at least one sideband or the at least one sideband and not the first sideband.

Example 6. The method of example 1, further including initializing the first sideband for the UCIe link following the reset state of the UCIe link.

Example 7. The method of any of examples 1-6, further including: identifying that a process implemented using the at least one sideband is complete; and clearing aggregate sideband data configured to represent at least two functional sidebands of the multi-module chiplet from a sideband aggregate information structure, in which the at least two functional sidebands include the at least one sideband.

Example 8. The method of any of examples 1-7, further including identifying that another multi-module chiplet supports a UCIe link using at least two sidebands, in which initializing the at least one sideband for the UCIe link that is a different functional sideband of the multi-module chiplet than the first sideband following the reset state of the UCIe link occurs following identifying that the another multi-module chiplet supports a UCIe link using at least two sidebands.

Example 9. The method of any of examples 1-8, in which transitioning the UCIe link in the active state having the first sideband that is active to the UCIe link in the reset state of the UCIe link includes transitioning the UCIe link in the active state to the UCIe link in the reset state based on an elapsed period.

Example 10. The method of example 9, further including: receiving a sideband configuration signal having a sideband timer data; setting a value at a sideband configuration timer information structure based on the sideband timer data; updating the value at the sideband configuration timer information structure; and comparing the value of the sideband configuration timer information structure to a threshold sideband timer value, in which the elapsed period is based on comparing the value of the sideband configuration timer information structure to the threshold sideband timer value.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:
1. A multi-module chiplet, comprising:
a plurality of mainbands;
a plurality of sidebands, each associates with one of the plurality of mainbands; and
a Universal Chiplet Interconnect Express (UCIe) link configuration device coupled to a UCIe link and configured to:
transition the UCIe link in an active state having a first sideband of the plurality of sidebands that is active to the UCIe link in a reset state;
read aggregate sideband data configured to represent at least two functional sidebands of the multi-module chiplet from a sideband aggregate information structure; and
initialize at least one sideband of the plurality of sidebands for the UCIe link that is a different functional sideband of the multi-module chiplet than the first sideband of the plurality of sidebands following the reset state of the UCIe link by initializing at least one functional sideband of the at least two functional sidebands represented by the aggregate sideband data.

2. The multi-module chiplet of claim 1, wherein the UCIe link configuration device is further configured to:
read active sideband data configured to represent a functional sideband of the multi-module chiplet from a sideband select information structure; and
initialize the at least one sideband of the plurality of sidebands for the UCIe link that is a different functional sideband of the multi-module chiplet than the first sideband of the plurality of sidebands following the reset state of the UCIe link by initializing the functional sideband represented by the active sideband data.

3. The multi-module chiplet of claim 1, wherein the UCIe link configuration device is further configured to:
receive a sideband configuration signal having active sideband data configured to represent a functional sideband of the multi-module chiplet, wherein the functional sideband includes the at least one sideband of the plurality of sidebands for the UCIe link that is a different functional sideband of the multi-module chiplet than the first sideband of the plurality of sidebands; and
set a value at a sideband select information structure based on the active sideband data.

4. The multi-module chiplet of claim 1, wherein the at least two functional sidebands represented by the aggregate sideband data include the first sideband of the plurality of sidebands and the at least one sideband of the plurality of sidebands or the at least one sideband of the plurality of sidebands and not the first sideband of the plurality of sidebands.

5. The multi-module chiplet of claim 1, wherein the UCIe link configuration device is further configured to initialize the first sideband of the plurality of sidebands for the UCIe link following the reset state of the UCIe link.

6. The multi-module chiplet of claim 1, wherein the UCIe link configuration device is further configured to:
identify that a process implemented using the at least one sideband of the plurality of sidebands is complete; and
clear aggregate sideband data configured to represent at least two functional sidebands of the multi-module chiplet from a sideband aggregate information structure, wherein the at least two functional sidebands include the at least one sideband of the plurality of sidebands.

7. The multi-module chiplet of claim 1, wherein the UCIe link configuration device is further configured to:
identify that another multi-module chiplet supports a UCIe link using at least two sidebands; and
initialize the at least one sideband of the plurality of sidebands for the UCIe link that is a different functional sideband of the multi-module chiplet than the first sideband of the plurality of sidebands following the reset state of the UCIe link and after identifying that the another multi-module chiplet supports a UCIe link using at least two sidebands.

8. The multi-module chiplet of claim 1, wherein the UCIe link configuration device is further configured to transition the UCIe link in the active state having the first sideband of the plurality of sidebands that is active to the UCIe link in the reset state based on an elapsed period.

9. The multi-module chiplet of claim 8, wherein the UCIe link configuration device is further configured to:
receive a sideband configuration signal having a sideband timer data;
set a value at a sideband configuration timer information structure based on the sideband timer data;
update the value at the sideband configuration timer information structure; and compare the value of the sideband configuration timer information structure to a threshold sideband timer value, wherein the elapsed period is based on comparing the value of the sideband configuration timer information structure to the threshold sideband timer value.

10. A method for Universal Chiplet Interconnect Express (UCIe) link configuration for multi-module chiplets of a computing device, comprising:
transitioning a UCIe link in an active state having a first sideband of a plurality of sidebands that is active to the UCIe link in a reset state, wherein each of the plurality of sidebands associated with one of a plurality of mainbands;
reading aggregate sideband data configured to represent at least two functional sidebands of the multi-module chiplet from a sideband aggregate information structure; and
initializing at least one sideband of the plurality of sidebands for the UCIe link that is a different functional sideband of a multi-module chiplet than the first sideband of the plurality of sidebands following the reset state of the UCIe link, comprising initializing at least one functional sideband of the at least two functional sidebands represented by the aggregate sideband data.

11. The method of claim 10, further comprising:
reading active sideband data configured to represent a functional sideband of the multi-module chiplet from a sideband select information structure,
wherein initializing the at least one sideband of the plurality of sidebands for the UCIe link that is a different functional sideband of the multi-module chiplet than the first sideband of the plurality of sidebands following the reset state of the UCIe link comprises initializing the functional sideband represented by the active sideband data.

12. The method of claim 10, further comprising:
receiving a sideband configuration signal having active sideband data configured to represent a functional sideband of the multi-module chiplet, wherein the functional sideband includes the at least one sideband of the plurality of sidebands for the UCIe link that is a different functional sideband of the multi-module chiplet than the first sideband of the plurality of sidebands; and setting a value at a sideband select information structure based on the active sideband data.

13. The method of claim 10, wherein the at least two functional sidebands represented by the aggregate sideband data include the first sideband of the plurality of sidebands and the at least one sideband of the plurality of sidebands or the at least one sideband of the plurality of sidebands and not the first sideband of the plurality of sidebands.

14. The method of claim 10, further comprising initializing the first sideband of the plurality of sidebands for the UCIe link following the reset state of the UCIe link.

15. The method of claim 10, further comprising:
identifying that a process implemented using the at least one sideband of the plurality of sidebands is complete; and
clearing aggregate sideband data configured to represent at least two functional sidebands of the multi-module chiplet from a sideband aggregate information structure, wherein the at least two functional sidebands include the at least one sideband of the plurality of sidebands.

16. The method of claim 10, further comprising identifying that another multi-module chiplet supports a UCIe link using at least two sidebands,
wherein initializing the at least one sideband of the plurality of sidebands for the UCIe link that is a different functional sideband of the multi-module chiplet than the first sideband of the plurality of sidebands following the reset state of the UCIe link occurs following identifying that the another multi-module chiplet supports a UCIe link using at least two sidebands.

17. The method of claim 10, wherein transitioning the UCIe link in the active state having the first sideband of the plurality of sidebands that is active to the UCIe link in the reset state comprises transitioning the UCIe link in the active state to the UCIe link in the reset state based on an elapsed period.

18. The method of claim 17, further comprising:
receiving a sideband configuration signal having a sideband timer data;
setting a value at a sideband configuration timer information structure based on the sideband timer data;
updating the value at the sideband configuration timer information structure; and
comparing the value of the sideband configuration timer information structure to a threshold sideband timer value, wherein the elapsed period is based on comparing the value of the sideband configuration timer information structure to the threshold sideband timer value.

19. A multi-module chiplet, comprising:
means for transitioning a Universal Chiplet Interconnect Express (UCIe) link in an active state having a first sideband of a plurality of sidebands that is active to the UCIe link in a reset state, wherein each of the plurality of sideband associates with one of a plurality of mainbands;
means for reading aggregate sideband data configured to represent at least two functional sidebands of the multi-module chiplet from a sideband aggregate information structure; and
means for initializing at least one sideband of the plurality of sidebands for the UCIe link that is a different functional sideband of a multi-module chiplet than the first sideband of the plurality of sidebands following the reset state of the UCIe link, comprising means for initializing at least one functional sideband of the at least two functional sidebands represented by the aggregate sideband data.

20. The multi-module chiplet of claim 19, further comprising:
means for reading active sideband data configured to represent a functional sideband of the multi-module chiplet from a sideband select information structure,
wherein means for initializing the at least one sideband of the plurality of sidebands for the UCIe link that is a different functional sideband of the multi-module chiplet than the first sideband of the plurality of sidebands following the reset state of the UCIe link comprises means for initializing the functional sideband represented by the active sideband data.

21. The multi-module chiplet of claim 19, further comprising:
means for receiving a sideband configuration signal having active sideband data configured to represent a functional sideband of the multi-module chiplet, wherein the functional sideband includes the at least one sideband of the plurality of sidebands for the UCIe link that is a different functional sideband of the multi-module chiplet than the first sideband of the plurality of sidebands; and
means for setting a value at a sideband select information structure based on the active sideband data.

22. The multi-module chiplet of claim 19, wherein the at least two functional sidebands represented by the aggregate sideband data include the first sideband of the plurality of sidebands and the at least one sideband of the plurality of sidebands or the at least one sideband of the plurality of sidebands and not the first sideband of the plurality of sidebands.

23. The multi-module chiplet of claim 19, further comprising means for initializing the first sideband of the plurality of sidebands for the UCIe link following the reset state of the UCIe link.

24. The multi-module chiplet of claim 19, further comprising:
means for identifying that a process implemented using the at least one sideband of the plurality of sidebands is complete; and
means for clearing aggregate sideband data configured to represent at least two functional sidebands of the multi-module chiplet from a sideband aggregate information structure, wherein the at least two functional sidebands include the at least one sideband of the plurality of sidebands.

25. The multi-module chiplet of claim 19, further comprising means for identifying that another multi-module chiplet supports a UCIe link using at least two sidebands,
wherein means for initializing the at least one sideband of the plurality of sidebands for the UCIe link that is a different functional sideband of the multi-module chiplet than the first sideband of the plurality of sidebands following the reset state of the UCIe link comprises means for initializing the at least one sideband of the plurality of sidebands for the UCIe link that is a different functional sideband of the multi-module chiplet than the first sideband of the plurality of sidebands following the reset state of the UCIe link and after identifying that the another multi-module chiplet supports a UCIe link using at least two sidebands.

26. The multi-module chiplet of claim 19, wherein means for transitioning the UCIe link in the active state having the first sideband of the plurality of sidebands that is active to the UCIe link in the reset state comprises means for transitioning the UCIe link in the active state to the UCIe link in the reset state based on an elapsed period.

27. The multi-module chiplet of claim 26, further comprising:
   means for receiving a sideband configuration signal having a sideband timer data;
   means for setting a value at a sideband configuration timer information structure based on the sideband timer data;
   means for updating the value at the sideband configuration timer information structure; and
means for comparing the value of the sideband configuration timer information structure to a threshold sideband timer value, wherein the elapsed period is based on comparing the value of the sideband configuration timer information structure to the threshold sideband timer value.

* * * * *